(12) United States Patent
Jang et al.

(10) Patent No.: US 10,947,338 B2
(45) Date of Patent: Mar. 16, 2021

(54) BLOCK POLYMER AND POLYMER ELECTROLYTE MEMBRANE COMPRISING SAME

(71) Applicant: LG CHEM, LTD., Seoul (KR)

(72) Inventors: Yong Jin Jang, Daejeon (KR); Joong Jin Han, Daejeon (KR); Youngjea Kim, Daejeon (KR); Esder Kang, Daejeon (KR); Yunah Yu, Daejeon (KR); Eunju Park, Daejeon (KR); Yu Jin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 99 days.

(21) Appl. No.: 16/087,512

(22) PCT Filed: Mar. 21, 2017

(86) PCT No.: PCT/KR2017/003001
§ 371 (c)(1),
(2) Date: Sep. 21, 2018

(87) PCT Pub. No.: WO2017/171290
PCT Pub. Date: Oct. 5, 2017

(65) Prior Publication Data
US 2019/0106530 A1    Apr. 11, 2019

(30) Foreign Application Priority Data
Mar. 29, 2016    (KR) .................. 10-2016-0037903

(51) Int. Cl.
*C08G 61/02*    (2006.01)
*C08G 75/06*    (2006.01)
(Continued)

(52) U.S. Cl.
CPC ............. *C08G 61/02* (2013.01); *C08G 65/40* (2013.01); *C08G 65/4018* (2013.01);
(Continued)

(58) Field of Classification Search
CPC ....................... C08G 65/4025; C08G 63/688
See application file for complete search history.

(56) References Cited

U.S. PATENT DOCUMENTS 5,459,007 A * 10/1995 Larson .................. G03G 9/122
430/115
5,573,882 A * 11/1996 Larson .................. G03G 9/133
430/115
(Continued)

FOREIGN PATENT DOCUMENTS

| KR | 10-2003-0076057 A | 9/2003 |
| KR | 2008-171620 A | 7/2008 |

(Continued)

OTHER PUBLICATIONS

Extended European Search Report dated Nov. 20, 2018 for Application No. 17775715.0.
(Continued)

*Primary Examiner* — Amanda C. Walke
(74) *Attorney, Agent, or Firm* — Birch, Stewart, Kolasch & Birch, LLP

(57) ABSTRACT

The present specification relates to a block polymer and a polymer electrolyte membrane including the same, a membrane-electrode assembly including the polymer electrolyte membrane, a fuel cell including the membrane-electrode assembly and a redox flow battery including the polymer electrolyte membrane.

13 Claims, 4 Drawing Sheets

(51) Int. Cl.
*C08G 75/23* (2006.01)
*H01M 8/1032* (2016.01)
*H01M 8/1039* (2016.01)
*H01M 8/18* (2006.01)
*C08L 61/00* (2006.01)
*C08G 65/40* (2006.01)
*H01M 8/1027* (2016.01)
*H01M 8/1025* (2016.01)
*H01M 8/1018* (2016.01)

(52) U.S. Cl.
CPC ......... *C08G 65/4056* (2013.01); *C08G 75/06* (2013.01); *C08G 75/23* (2013.01); *C08L 61/00* (2013.01); *H01M 8/1025* (2013.01); *H01M 8/1027* (2013.01); *H01M 8/1032* (2013.01); *H01M 8/1039* (2013.01); *H01M 8/188* (2013.01); *C08G 2261/126* (2013.01); *H01M 2008/1095* (2013.01); *H01M 2300/0082* (2013.01); *Y02E 60/50* (2013.01); *Y02P 20/10* (2015.11)

(56) References Cited

U.S. PATENT DOCUMENTS

| | | | | |
|---|---|---|---|---|
| 8,617,592 B2 * | 12/2013 | Jiang | ............... | A61K 9/5153 424/450 |
| 8,680,038 B2 * | 3/2014 | Balastre | ............... | A61K 8/8158 510/475 |
| 9,476,063 B2 * | 10/2016 | Stayton | ............... | C12N 15/111 |
| 9,653,745 B2 * | 5/2017 | Izuhara | ............... | H01M 8/1025 |
| 2003/0013817 A1 * | 1/2003 | Lu | ............... | B01D 69/141 D69/141 |
| 2007/0196712 A1 | 8/2007 | Kim et al. | | |
| 2008/0114149 A1 * | 5/2008 | Moore | ............... | C08G 75/23 528/293 |
| 2008/0114183 A1 | 5/2008 | Moore et al. | | |
| 2009/0018270 A1 * | 1/2009 | Crooks | ............... | C08F 220/28 525/89 |
| 2009/0163692 A1 | 6/2009 | Moore et al. | | |
| 2011/0020731 A1 * | 1/2011 | Yoshimura | ............... | H01B 1/122 429/483 |
| 2012/0238648 A1 | 9/2012 | Zhou et al. | | |
| 2012/0259021 A1 * | 10/2012 | Jiang | ............... | A61K 9/5153 514/772.1 |
| 2014/0065512 A1 * | 3/2014 | Kwon | ............... | H01M 8/1039 429/480 |
| 2014/0227627 A1 * | 8/2014 | He | ............... | B01D 71/68 429/492 |
| 2015/0311541 A1 | 10/2015 | Lloyd et al. | | |
| 2015/0328630 A1 | 11/2015 | Yoo et al. | | |
| 2015/0376341 A1 * | 12/2015 | Ait-Haddou | ............... | C08G 75/23 521/134 |
| 2017/0338507 A1 * | 11/2017 | Jang | ............... | C08G 75/20 |

FOREIGN PATENT DOCUMENTS

| | | |
|---|---|---|
| KR | 10-2012-0082007 A | 7/2012 |
| KR | 10-1202331 B1 | 11/2012 |
| KR | 10-2013-0011676 A | 1/2013 |
| KR | 10-2014-0126199 A | 10/2014 |
| KR | 10-2014-0133748 A | 11/2014 |
| KR | 10-2014-0145997 A | 12/2014 |
| KR | 10-1546370 B1 | 8/2015 |
| WO | WO 2017-052226 A1 | 3/2017 |

OTHER PUBLICATIONS

International Search Report issued in PCT/KR2017/003001, dated Jul. 17, 2017.

\* cited by examiner

[FIG. 1]
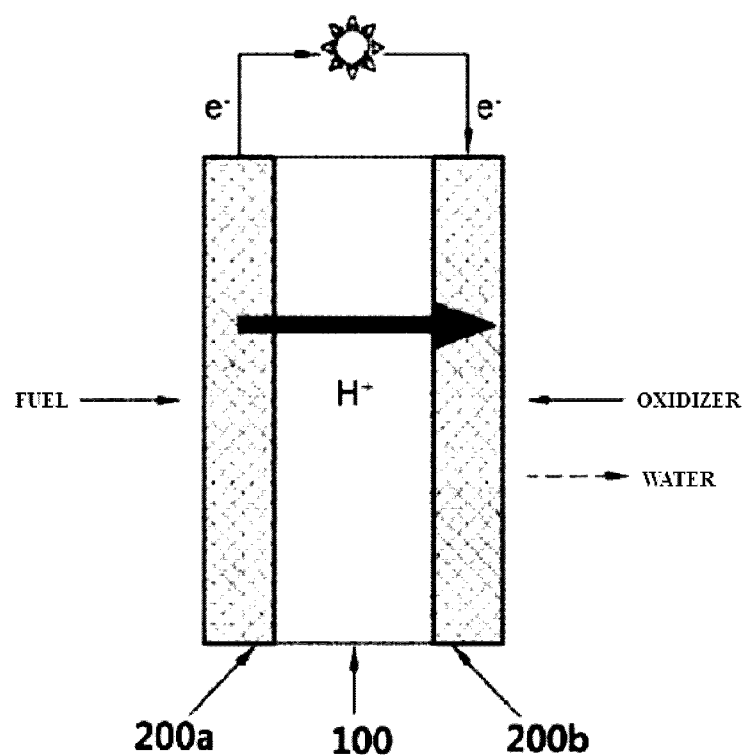

[Figure 2]
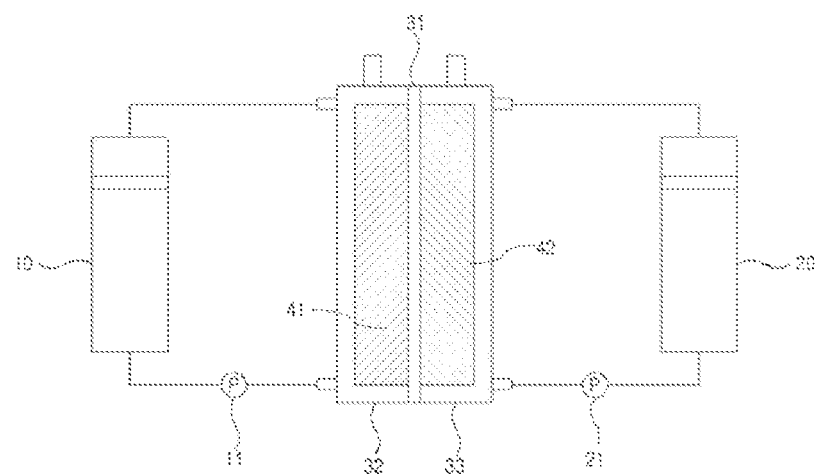
[Figure 3]
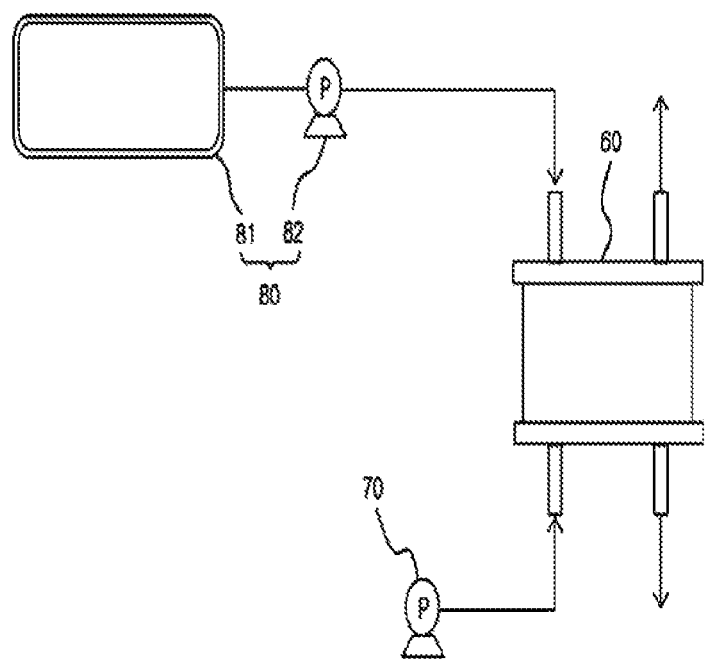

[Figure 4]
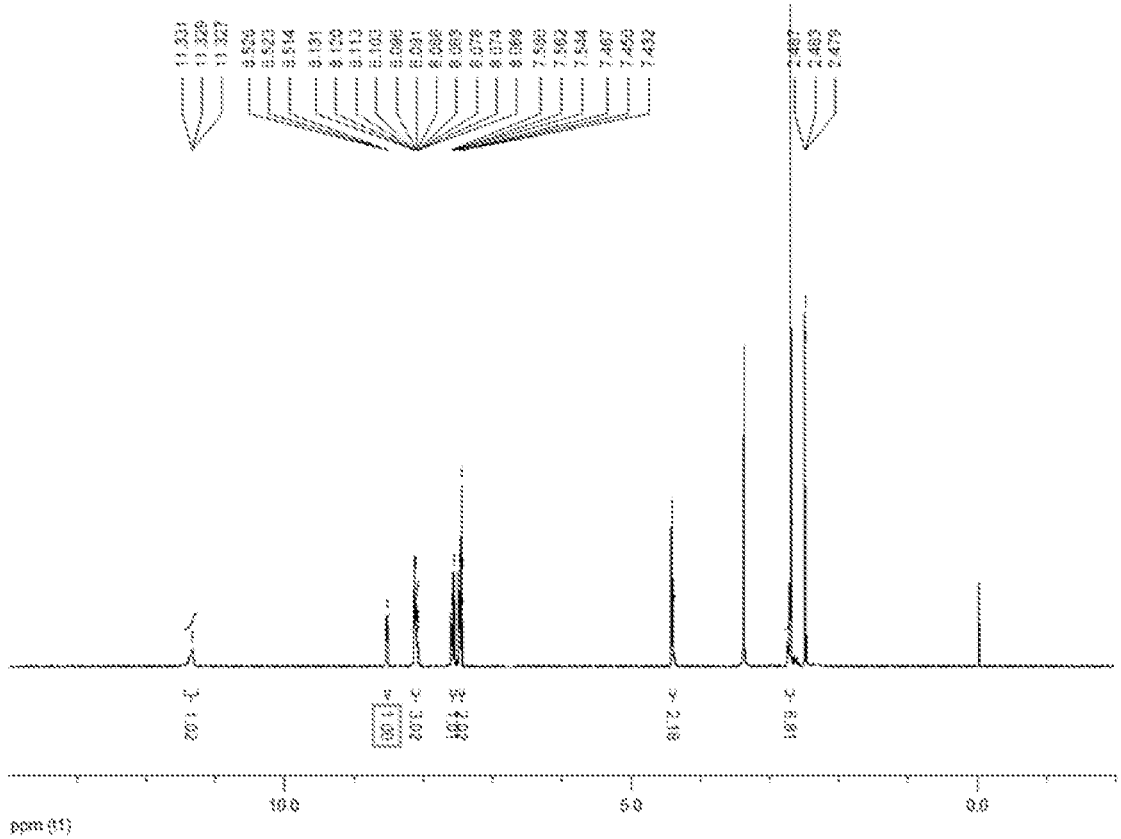
[Figure 5]
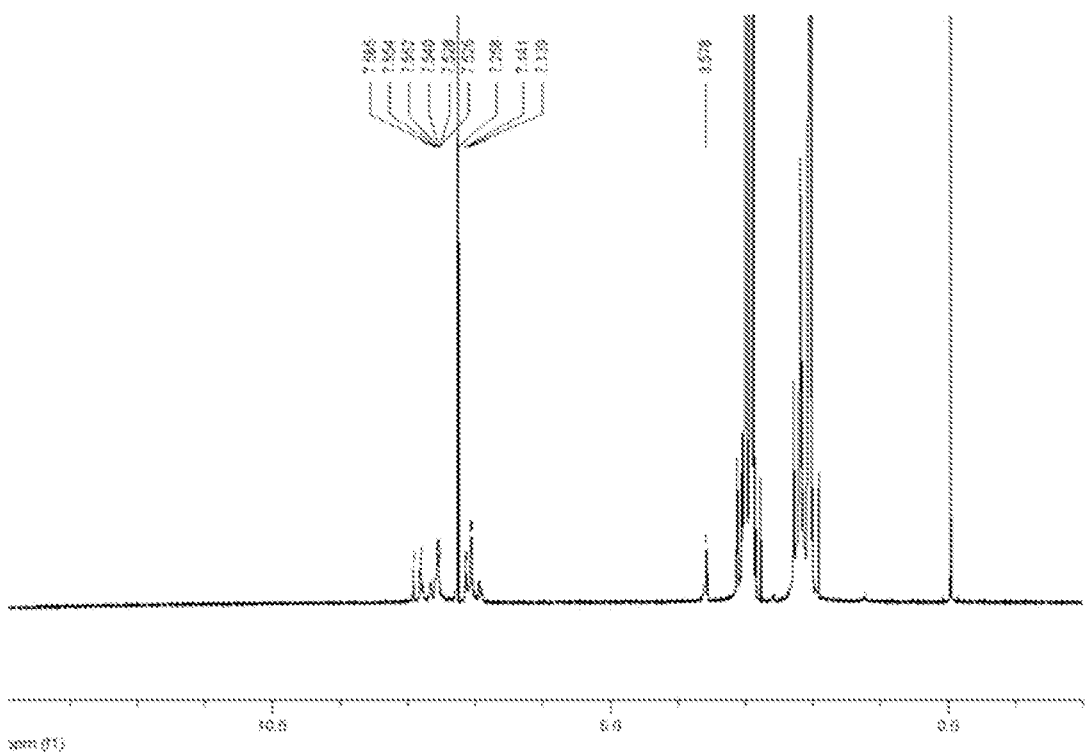

[Figure 6]
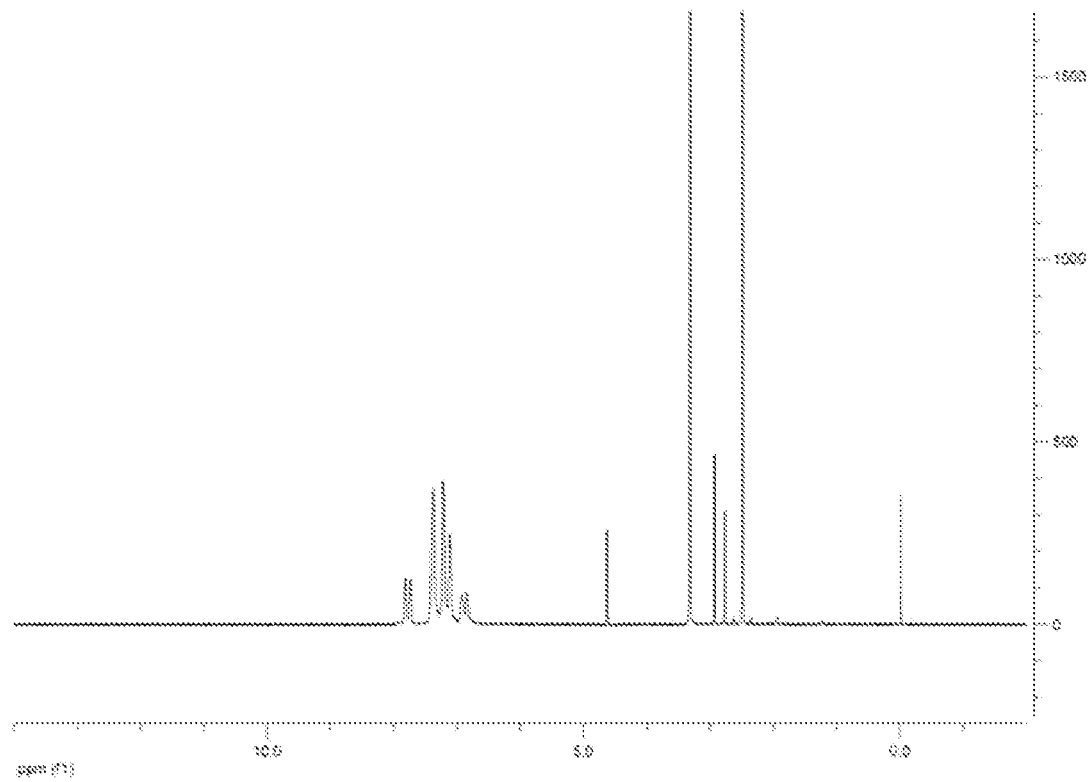

BLOCK POLYMER AND POLYMER ELECTROLYTE MEMBRANE COMPRISING SAME

TECHNICAL FIELD

The present specification claims priority to and the benefits of Korean Patent Application No. 10-2016-0037903, filed with the Korean Intellectual Property Office on Mar. 29, 2016, the entire contents of which are incorporated herein by reference The present specification relates to a block polymer and a polymer electrolyte membrane including the same.

BACKGROUND ART

A fuel cell is an energy conversion device directly converting chemical energy of fuel into electric energy. In other words, a fuel cell employs a power generation method utilizing a fuel gas and an oxidizer, and using electrons generated during an oxidation-reduction reaction thereof to produce power. A membrane-electrode assembly (MEA) of a fuel cell is a part where an electrochemical reaction of hydrogen and oxygen occurs, and is formed with a cathode, an anode and an electrolyte membrane, that is, an ion conductive electrolyte membrane.

A redox flow battery (oxidation-reduction flow battery) is a system charged-discharged by active materials included in a liquid electrolyte being oxidized-reduced, and is an electrochemical storage device directly storing chemical energy of the active materials as electric energy. A unit cell of the redox flow battery includes an electrode, an electrolyte and an ion-exchange membrane (electrolyte membrane).

Due to their high energy efficiency and environmental friendly properties of low contaminant emissions, fuel cells and redox flow batteries have been researched and developed as a next generation energy source.

A core constituent in a fuel cell and a redox flow battery is a polymer electrolyte membrane capable of cation exchange, and properties of 1) excellent proton conductivity, 2) preventing an electrolyte crossover, 3) high chemical resistance, 4) strengthening mechanical properties and/or 4) low swelling ratio are favorably required. The polymer electrolyte membrane is divided into fluorine-based, partial fluorine-based, hydrocarbon-based and the like, and a partial fluorine-based polymer electrolyte membrane has advantages of exhibiting excellent physical and chemical stability and high thermal stability by having a fluorine-based main chain. In addition, in the partial fluorine-based polymer electrolyte membrane, a cation transfer functional group is attached at the end of the fluorine-based chain as in a fluorine-based polymer electrolyte membrane, and therefore, advantages of both a hydrocarbon-based polymer electrolyte membrane and a fluorine-based polymer electrolyte membrane are obtained.

However, a partial fluorine-based polymer electrolyte membrane has a problem in that cation conductivity is relatively low since micro-phase separation and aggregation of a cation transfer functional group are not effectively controlled. Accordingly, researches have been progressed in the direction of securing high cation conductivity through controlling distribution and micro-phase separation of a sulfonic acid group.

DISCLOSURE

Technical Problem

The present specification is directed to providing a block polymer and a polymer electrolyte membrane including the same.

Technical Solution

One embodiment of the present disclosure provides a block polymer including a hydrophobic block; and a hydrophilic block, wherein the hydrophilic block includes a unit derived from a compound represented by the following Chemical Formula 1, and the hydrophobic block includes a cationic group and a halogen group.

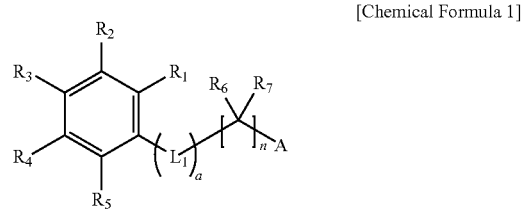

[Chemical Formula 1]

In Chemical Formula 1,

A is $-SO_3H$, $-SO_3^-M^+$, $-COOH$, $-COO^-M^+$, $-PO_3H_2$, $-PO_3H^-M^+$, $-PO_3^{2-}2M^+$, $-O(CF_2)_mSO_3H$, $-O(CF_2)_mSO_3^-M^+$, $-O(CF_2)_mCOOH$, $-O(CF_2)_mCOO^-M^+$, $-O(CF_2)_mPO_3H_2$, $-O(CF_2)_mPO_3H^-M^+$ or $-O(CF_2)_m PO_3^{2-}2M^+$, m is an integer of 2 to 6, M is a group 1 element, $R_1$ to $R_5$ are the same as or different from each other, and each independently hydrogen; a halogen group; or a hydroxyl group, at least two of $R_1$ to $R_5$ are a halogen group; or a hydroxyl group, $R_6$ and $R_7$ are the same as or different from each other, and each independently a halogen group, $L_1$ is a direct bond; $-S-$; $-O-$; $-N(R)-$; $-SO_2-$; or a substituted or unsubstituted alkylene group having 1 to 10 carbon atoms, a is an integer of 0 to 2, and when a is 2, structures in the parentheses are the same as or different from each other, R is hydrogen; or a substituted or unsubstituted alkyl group, and n is an integer of 2 to 10, and when n is 2 or greater, structures in the parentheses are the same as or different from each other.

Advantageous Effects

A polymer electrolyte membrane including a block polymer according to one embodiment of the present specification readily forms a hydrophilic-hydrophobic phase separation structure.

In addition, by controlling the phase separation structure, the polymer electrolyte membrane efficiently forms a hydrophilic channel in the polymer electrolyte membrane.

Additionally, the polymer electrolyte membrane including a block polymer according to one embodiment of the present specification can exhibit advantages of both a cation polymer electrolyte membrane and an anion polymer electrolyte membrane. In other words, the polymer electrolyte membrane according to one embodiment of the present specification can exhibit characteristics of both cationic and anionic separators. Particularly, based on existing anion separators, cation conductivity, a threshold of the separator, with respect to the anion separator, is enhanced, and as a result, battery performance can be enhanced.

In addition, when using the polymer electrolyte membrane according to one embodiment of the present specification in a fuel cell such as a redox flow battery, a vanadium ion crossover is reduced, and durability can be improved.

DESCRIPTION OF DRAWINGS

FIG. 1 is a schematic diagram showing a principle of electricity generation of a fuel cell.

FIG. 2 is a diagram schematically illustrating one embodiment of a redox flow battery.

FIG. 3 is a diagram schematically illustrating one embodiment of a fuel cell.

FIG. 4 is an NMR spectrum of 1-(2-fluoro-5-((4-fluorophenyl)sulfonyl)phenyl)-N,N-dimethylmethaneamine hydrochloride synthesized in Preparation Example 2.

FIG. 5 is an NMR spectrum of a polymer synthesized by Reaction Formula 1 of Example 1.

FIG. 6 is an NMR spectrum of a polymer synthesized by Reaction Formula 3 of Example 2.

REFERENCE NUMERAL

100: Electrolyte Membrane
200a: Anode
200b: Cathode
10, 20: Tank
111, 21: Pump
31: Electrolyte Membrane
32: Positive Electrode Cell
33: Negative Electrode Cell
41: Positive Electrode Liquid Electrolyte
42: Negative Electrode Liquid Electrolyte
60: Stack
70: Oxidizer Supply Unit
80: Fuel Supply Unit
81: Fuel Tank
82: Pump

MODE FOR DISCLOSURE

Hereinafter, the present specification will be described in more detail.

In the present specification, a description of a certain part "including" certain constituents means capable of further including other constituents, and does not exclude other constituents unless particularly stated on the contrary.

In the present specification, a 'unit' is a repeated structure of a monomer included in a polymer, and means a structure of a monomer being bonded in a polymer through polymerization.

In the present specification, the meaning of 'including a unit' means being included in a main chain in a polymer.

In the present specification,

means bonding to adjacent substituents or a main chain of a polymer.

In the present specification, the block polymer means a polymer formed by one block, and one, two or more blocks that are different from the one block being linked to each other by a polymer main chain.

In one embodiment of the present specification, the block polymer may include a hydrophilic block and a hydrophobic block. Specifically, in one embodiment, the block polymer may include a hydrophilic block including a unit represented by Chemical Formula 1; and a hydrophobic block including a cationic group and a halogen group.

The "hydrophilic block" of the present specification means a block having an ion-exchange group as a functional group. Herein, the functional group may be at least any one selected from the group consisting of —$SO_3H$, —$SO_3^-M^+$, —COOH, —$COO^-M^+$, —$PO_3H_2$, —$PO_3H^-M^+$, —$PO_3^{2-}2M^+$, —$O(CF_2)_mSO_3H$, —$O(CF_2)_mSO_3^-M^+$, —$O(CF_2)_mCOOH$, —$O(CF_2)_mCOO^-M^+$, —$O(CF_2)_mPO_3H_2$, —$O(CF_2)_mPO_3H^-M^+$ and —$O(CF_2)_mPO_3^{2-}2M^+$. Herein, M may be a metallic element. In other words, the functional group may be hydrophilic.

By a first unit represented by Chemical Formula 1 according to one embodiment of the present specification including a functional group of A, hydrophilicity may be obtained.

The "block having an ion-exchange group" of the present specification means a block including an average of 0.5 or more ion-exchange groups when representing as the number of ion-exchange groups per one structure unit forming the corresponding block, and including an average of 1.0 or more ion-exchange groups per one structure unit is more preferred.

In one embodiment of the present specification, the hydrophobic block includes a cationic group and a halogen group. In this case, enhancement in acid resistance and/or durability of the block polymer may be expected.

One embodiment of the present specification provides a block polymer including a hydrophobic block; and a hydrophilic block, wherein the hydrophilic block includes a unit derived from a compound represented by the following Chemical Formula 1, and the hydrophobic block includes a cationic group and a halogen group.

[Chemical Formula 1]

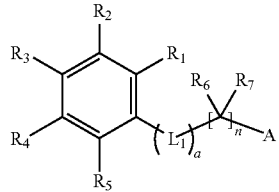

In Chemical Formula 1,
A is —$SO_3H$, —$SO_3^-M^+$, —COOH, —$COO^-M^+$, —$PO_3H_2$, —$PO_3H^-M^+$, —$PO_3^{2-}2M^+$, —$O(CF_2)_mSO_3H$, —$O(CF_2)_mSO_3^-M^+$, —$O(CF_2)_mCOOH$, —$O(CF_2)_mCOO^-M^+$, —$O(CF_2)_mPO_3H_2$, —$O(CF_2)_mPO_3H^-M^+$ or —$O(CF_2)_mPO_3^{2-}2M^+$, m is an integer of 2 to 6,
M is a group 1 element,
$R_1$ to $R_5$ are the same as or different from each other, and each independently hydrogen; a halogen group; or a hydroxyl group,
at least two of $R_1$ to $R_5$ are a halogen group; or a hydroxyl group, $R_6$ and $R_7$ are the same as or different from each other, and each independently a halogen group, $L_1$ is a direct bond; —S—; —O—; —N(R)—; —SO$_2$—; or a substituted or unsubstituted alkylene group having 1 to 10 carbon atoms, a is an integer of 0 to 2, and when a is 2, structures in the parentheses are the same as or different from each other, R is hydrogen; or a substituted or unsubstituted alkyl group, and n is an integer of 2 to 10, and when n is 2 or greater, structures in the parentheses are the same as or different from each other.

In one embodiment of the present specification, the cationic group may be represented by -(L$_2$)$_b$-N$^+$R$_{11}$R$_{12}$R$_{13}$; -(L$_2$)$_b$-P$^+$R$_{11}$R$_{12}$R$_{13}$; or the following Chemical Formula 2.

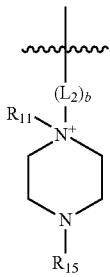

In Chemical Formula 2, $L_2$ is a direct bond; —O—; —N(R$_{14}$)—; —S—; —SO$_2$—; or a substituted or unsubstituted alkylene group having 1 to 10 carbon atoms, b is an integer of 1 to 10, when b is 2 or greater, the two or more L$_2$s are the same as or different from each other, and $R_{11}$ to $R_{15}$ are the same as or different from each other, and each independently hydrogen; or a substituted or unsubstituted alkyl group having 1 to 10 carbon atoms.

In one embodiment of the present specification, the hydrophobic block includes a unit derived from one or more types of a compound represented by the following Chemical Formula 3 and a compound represented by the following Chemical Formula 4.

[Chemical Formula 3]

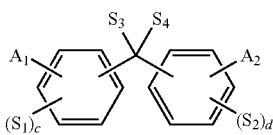

[Chemical Formula 4]

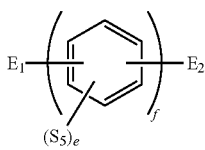

In Chemical Formula 3 and Chemical Formula 4, $A_1$ and $A_2$ are the same as or different from each other, and each independently a hydroxyl group; a thiol group; or a halogen group, $S_1$ and $S_2$ are the same as or different from each other, and each independently hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L$_2$)$_b$-N$^+$R$_{11}$R$_{12}$R$_{13}$; -(L$_2$)$_b$-P$^+$R$_{11}$R$_{12}$R$_{13}$; or a structure represented by the following Chemical Formula 2, c and d are each an integer of 1 to 4, when c and d are each an integer of 2 or greater, structures in the two or more parentheses are the same as or different from each other, $S_3$ and $S_4$ are the same as or different from each other, and each independently hydrogen; a halogen group; an alkyl group; or a haloalkyl group, $E_1$ and $E_2$ are the same as or different from each other, and each independently a hydroxyl group; a thiol group; or a halogen group, and e is an integer of 1 to 4, f is an integer of 1 to 3, when e and f are each an integer of 2 or greater, structures in the parentheses are the same as or different from each other, $S_5$ is hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; -(L$_2$)$_b$-N$^+$R$_{11}$R$_{12}$R$_{13}$; -(L$_2$)$_b$-P$^+$R$_{11}$R$_{12}$R$_{13}$; or a structure represented by the following Chemical Formula 2, $S_3$ and $S_4$ are each independently a halogen group or a haloalkyl group, or $S_5$ is a halogen group or a haloalkyl group, the hydrophobic block includes one, two or more of -(L$_2$)$_b$-N$^+$R$_{11}$R$_{12}$R$_{13}$; -(L$_2$)$_b$-P$^+$R$_{11}$R$_{12}$R$_{13}$; and a structure represented by the following Chemical Formula 2,

[Chemical Formula 2]

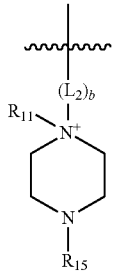

in Chemical Formula 2, $L_2$ is a direct bond; —O—; —N(R$_{14}$)—; —S—; —SO$_2$—; or a substituted or unsubstituted alkylene group having 1 to 10 carbon atoms, b is an integer of 1 to 10, when b is 2 or greater, the two or more L$_2$s are the same as or different from each other, and $R_{11}$ to $R_{15}$ are the same as or different from each other, and each independently hydrogen; or a substituted or unsubstituted alkyl group having 1 to 10 carbon atoms.

In one embodiment, Chemical Formula 4 may be represented by any one of the following Chemical Formulae 4-A to Chemical Formula 4-H.

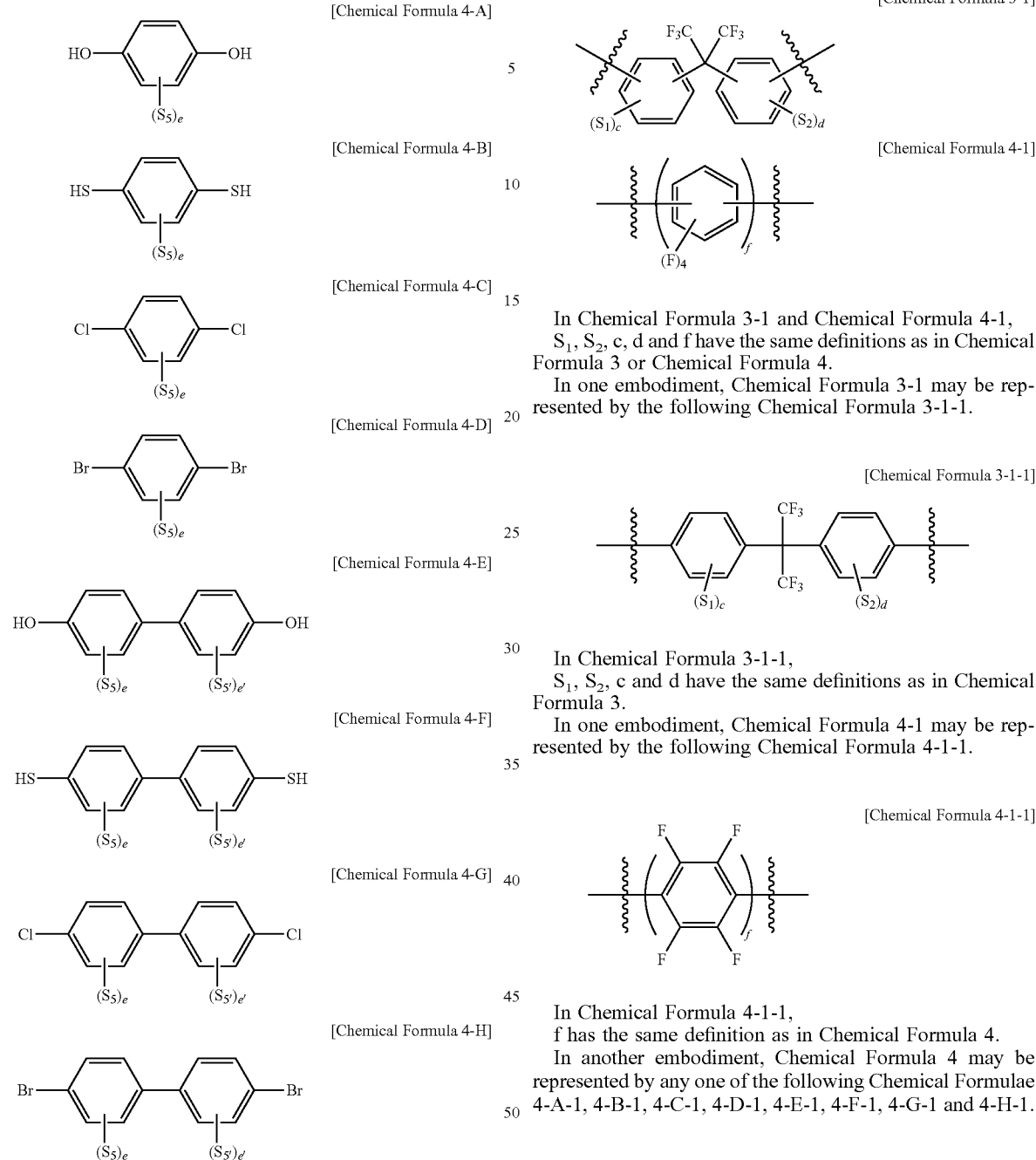

In Chemical Formulae 4-A to 4-H, $S_5$ and e have the same definitions as in Chemical Formula 4, $S_{5'}$ has the same definition as $S_5$, and $S_5$ and $S_{5'}$ are the same as or different from each other, and e' has the same definition as e, and e and e' are the same as or different from each other.

In one embodiment of the present specification, the hydrophobic block includes at least one or more of a unit represented by the following Chemical Formula 3-1 and a unit represented by the following Chemical Formula 4-1.

In Chemical Formula 3-1 and Chemical Formula 4-1, $S_1$, $S_2$, c, d and f have the same definitions as in Chemical Formula 3 or Chemical Formula 4.

In one embodiment, Chemical Formula 3-1 may be represented by the following Chemical Formula 3-1-1.

In Chemical Formula 3-1-1, $S_1$, $S_2$, c and d have the same definitions as in Chemical Formula 3.

In one embodiment, Chemical Formula 4-1 may be represented by the following Chemical Formula 4-1-1.

In Chemical Formula 4-1-1, f has the same definition as in Chemical Formula 4.

In another embodiment, Chemical Formula 4 may be represented by any one of the following Chemical Formulae 4-A-1, 4-B-1, 4-C-1, 4-D-1, 4-E-1, 4-F-1, 4-G-1 and 4-H-1.

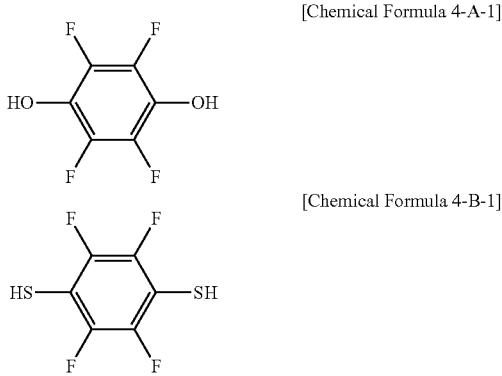

[Chemical Formula 4-C-1]

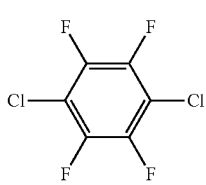

[Chemical Formula 4-D-1]

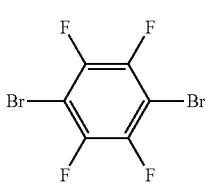

[Chemical Formula 4-E-1]

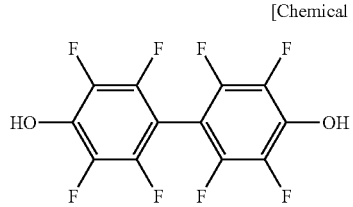

[Chemical Formula 4-F-1]

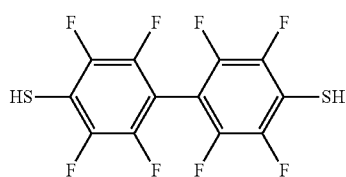

[Chemical Formula 4-G-1]

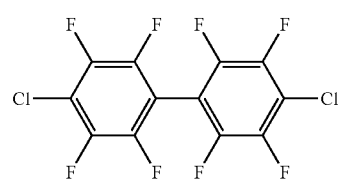

[Chemical Formula 4-H-1]

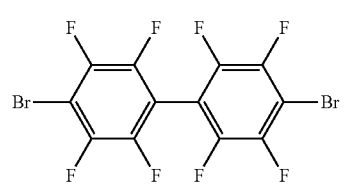

In one embodiment of the present specification, the hydrophobic block may include a unit represented by the following Chemical Formula 5.

In Chemical Formula 5, $X_1$ is a direct bond; —CO—; —SO$_2$—; or an alkylene group substituted with a halogen group, $X_2$ is —O—; or —S—, $X_3$ is a direct bond or an alkylene group substituted with a halogen group, k is 0 or 1, p, q, r and s are each independently an integer of 0 to 4, t, u, v and w are each independently 0 or 1, a sum of t, u, v and w is 1 or greater, a sum of p and t, a sum of q and u, a sum of r and v and a sum of s and w are each 4, when p, q, r and s are each 2 or greater, substituents in the parentheses are the same as or different from each other, $R_{21}$ to $R_{24}$ are the same as or different from each other, and each independently hydrogen or a halogen group, at least one of $X_1$ and $X_3$ is an alkylene group substituted with a halogen group, and at least one of $R_{21}$ to $R_{24}$ is a halogen group, $R_{31}$ to $R_{34}$ are hydrogen; -(L$_2$)$_b$-N$^+$R$_{11}$R$_{12}$R$_{13}$; -(L$_2$)$_b$-P$^+$R$_{11}$R$_{12}$R$_{13}$; or a cationic group represented by the following Chemical Formula 2, and at least one of $R_{31}$ to $R_{34}$ is -(L$_2$)$_b$-N$^+$R$_{11}$R$_{12}$R$_{13}$; -(L$_2$)$_b$-P$^+$R$_{11}$R$_{12}$R$_{13}$; or a cationic group represented by the following Chemical Formula 2,

[Chemical Formula 2]

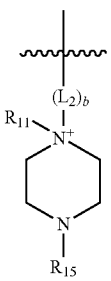

in Chemical Formula 2, $L_2$ is a direct bond; —O—; —N(R$_{14}$)—; —S—; —SO$_2$—; or a substituted or unsubstituted alkylene group having 1 to 10 carbon atoms, b is an integer of 1 to 10, when b is 2 or greater, the two or more L$_2$s are the same as or different from each other, and $R_{11}$ to $R_{15}$ are the same as or different from each other, and each independently hydrogen; or a substituted or unsubstituted alkyl group having 1 to 10 carbon atoms.

In one embodiment, at least one of $R_{31}$ and $R_{32}$ is -(L$_2$)$_b$-N$^+$R$_{11}$R$_{12}$R$_{13}$; -(L$_2$)$_b$-P$^+$R$_{11}$R$_{12}$R$_{13}$; or a cationic group represented by the following Chemical Formula 2.

In one embodiment of the present specification, a is 1.

In one embodiment of the present specification, $L_1$ is —S—, and an S atom is used as a linker of a —[C(R$_6$)(R$_7$)]$_n$-A structure and a benzene ring in Chemical Formula

[Chemical Formula 5]

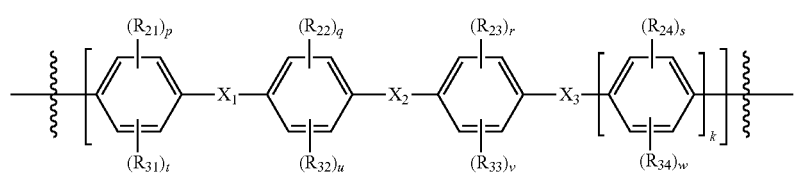

1. In this case, an electron withdrawing character of the —[C($R_6$)($R_7$)]$_n$-A linked by the S atom allows the polymer to be readily formed, and a stable polymer may be provided.

In one embodiment of the present specification, $R_6$ and $R_7$ are the same as or different from each other, and each independently a halogen group. Specifically, $R_6$ and $R_7$ may be each independently selected from the group consisting of F; Cl; Br; and I.

When the polymer including the unit represented by Chemical Formula 1 of the present specification is included in the polymer electrolyte membrane and $R_6$ and $R_7$ of Chemical Formula 1 are a halogen group, there is an advantage in that electrons are favorably attracted facilitating hydrogen ion migration, and the structure of the polymer electrolyte membrane is strengthened. Specifically, according to one embodiment of the present specification, the advantage may be maximized when $R_6$ and $R_7$ are fluorine.

In one embodiment of the present specification, n is an integer of 2 to 10. In another embodiment of the present specification, n is an integer of 2 to 6.

A monomer including the unit of Chemical Formula 1 according to one embodiment of the present specification may control the number of n. In this case, by controlling the length of the structure in the parenthesis, phase separation of the polymer electrolyte membrane may be readily accomplished, and hydrogen ion migration of the polymer electrolyte membrane may be facilitated. In addition, the monomer including the unit of Chemical Formula 1 may control reactivity difference and final polymer properties as necessary depending on controlling the length of the structure in the parenthesis.

In one embodiment of the present specification, n is 2.

In another embodiment, n is 3.

In another embodiment, n is 4.

In another embodiment, n is 5.

In another embodiment, n is 6.

In another embodiment, n is 7.

In one embodiment of the present specification, n is 8.

In another embodiment, n is 9.

In one embodiment of the present specification, n is 10.

In one embodiment of the present specification, A is —$SO_3H$ or —$SO_3^-M^+$.

In another embodiment, A is —$SO_3H$.

As above, when A is —$SO_3H$ or —$SO_3^-M^+$ in Chemical Formula 1, a chemically stable polymer may be formed.

In one embodiment of the present specification, M is a group 1 element.

In the present specification, the group 1 element may be Li, Na or K.

In one embodiment of the present specification, at least two of $R_1$ to $R_5$ are a halogen group; or a hydroxyl group.

In one embodiment of the present specification, at least two of $R_1$ to $R_5$ are a halogen group; or a hydroxyl group, and the rest are hydrogen.

In one embodiment of the present specification, $R_1$ and $R_3$ being a halogen group or a hydroxyl group, and $R_2$, $R_4$ and $R_5$ being hydrogen is excellent in terms of polymerization.

In one embodiment of the present specification, the first unit derived from the compound represented by Chemical Formula 1 is represented by any one of the following Chemical Formulae 1-1 to 1-9.

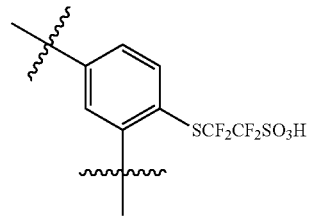

[Chemical Formulae 1-1]

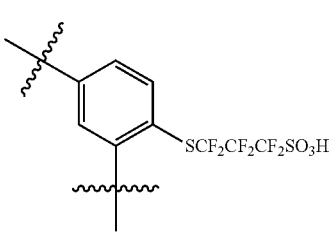

[Chemical Formulae 1-2]

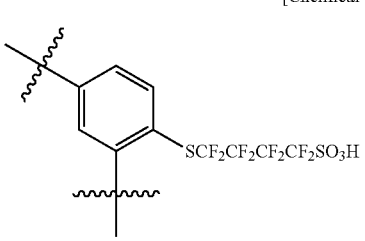

[Chemical Formulae 1-3]

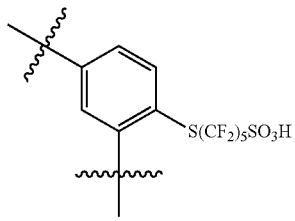

[Chemical Formulae 1-4]

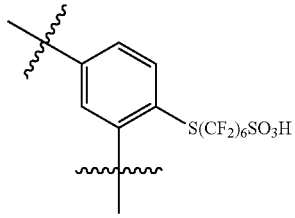

[Chemical Formulae 1-5]

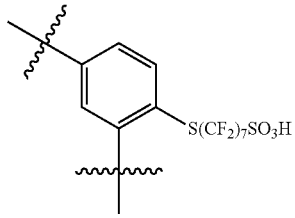

[Chemical Formulae 1-6]

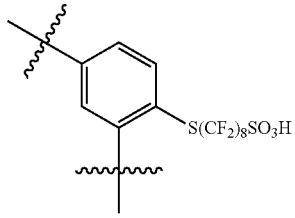

[Chemical Formulae 1-7]

[Chemical Formulae 1-8]

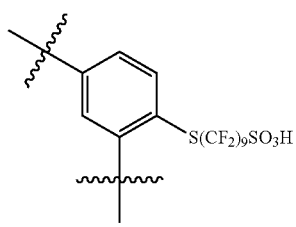

[Chemical Formulae 1-9]

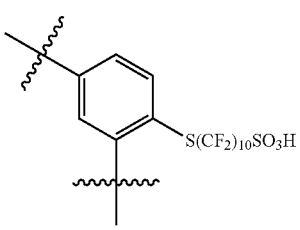

In one embodiment of the present specification, the hydrophilic block includes the unit represented by Chemical Formula 1; and a unit derived from the compound represented by Chemical Formula 4.

In one embodiment of the present specification, $S_1$ is -$(L_2)_b$-$N^+R_{11}R_{12}R_{13}$.

In another embodiment, $S_2$ is -$(L_2)_b$-$N^+R_{11}R_{12}R_{13}$.

In one embodiment of the present specification, $S_5$ is -$(L_2)_b$-$N^+R_{11}R_{12}R_{13}$.

In one embodiment of the present specification, the hydrophilic block includes the unit represented by Chemical Formula 1, and may further include other units. For example, the hydrophilic block may further include a unit derived from a compound represented by the following Chemical Formula 3'.

[Chemical Formula 3']

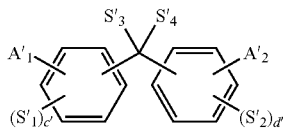

In Chemical Formula 3', $A'_1$ and $A'_2$ are the same as or different from each other, and each independently a hydroxyl group; a thiol group; or a halogen group, $S'_1$ and $S'_2$ are the same as or different from each other, and each independently hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; or a substituted or unsubstituted heterocyclic group, c' and d' are each an integer of 1 to 4, when c' and d' are each an integer of 2 or greater, structures in the two or more parentheses are the same as or different from each other, and $S'_3$ and $S'_4$ are the same as or different from each other, and each independently hydrogen; a halogen group; an alkyl group; or a haloalkyl group.

In one embodiment of the present specification, it is sufficient that the hydrophobic block includes a cationic group and a halogen group, and positions thereof are not limited.

In one embodiment of the present specification, the block polymer includes a unit represented by the following Chemical Formula A, B, C or D.

[Chemical Formula A]

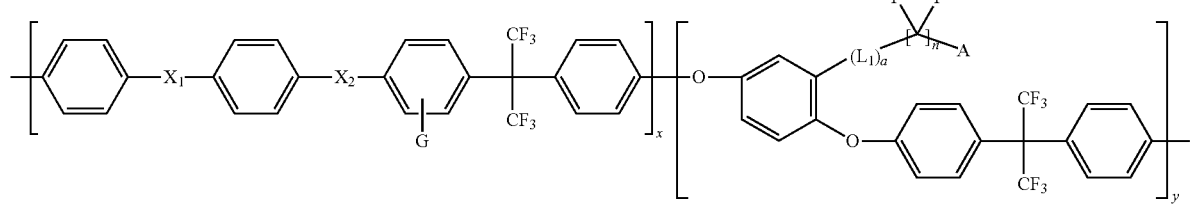

[Chemical Formula B]

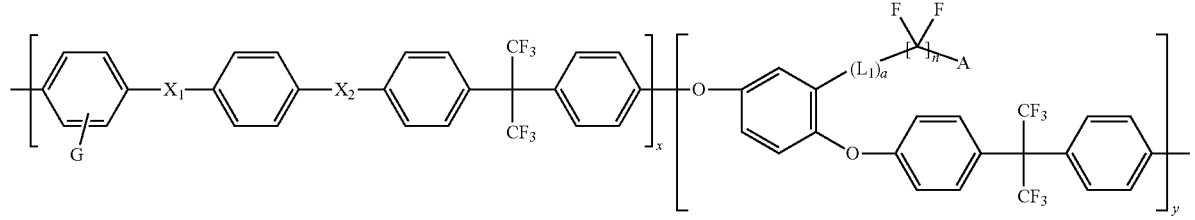

[Chemical Formula C]

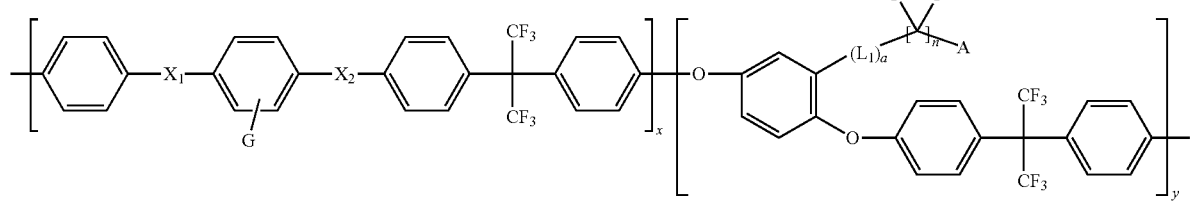

-continued

[Chemical Formula D]

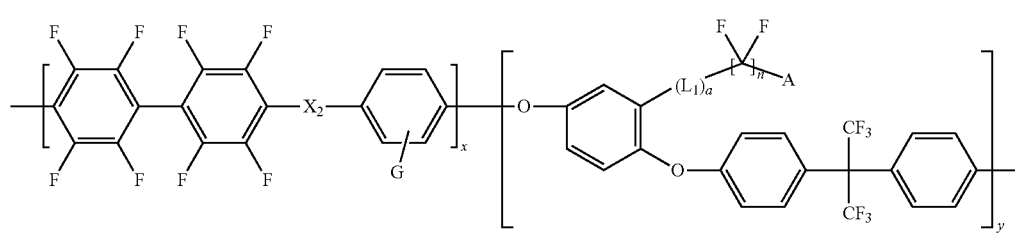

In Chemical Formulae A to D,
$X_1$, $X_2$, $L_1$, $L_2$, a, b and n are the same as described above,
G is the same as the cationic group,
x and y are each independently a mole ratio of the block polymer, and are a real number of greater than 0 and less than 1, and
x+y=1.

In another embodiment, G of Chemical Formulae A to D may be

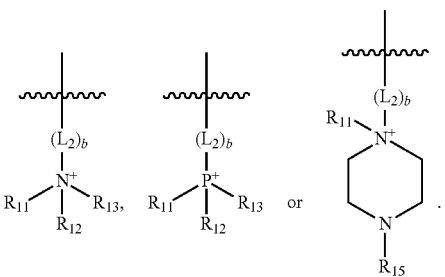

In one embodiment of the present specification, R11 to R13 and R15 are an alkyl group.

In one embodiment of the present specification, R11 to R13 and R15 are a methyl group.

In another embodiment, G of Chemical Formulae A to D may be

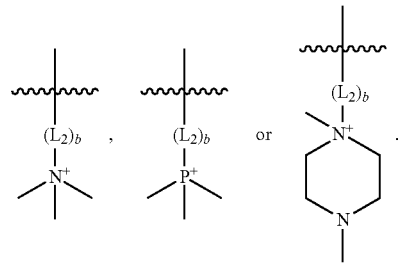

The polymer according to one embodiment of the present disclosure may have structures as below.

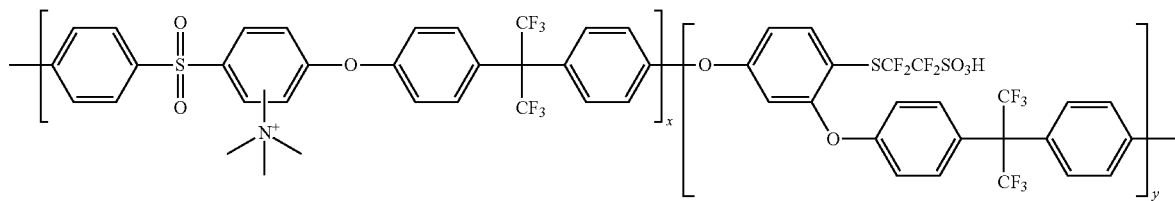

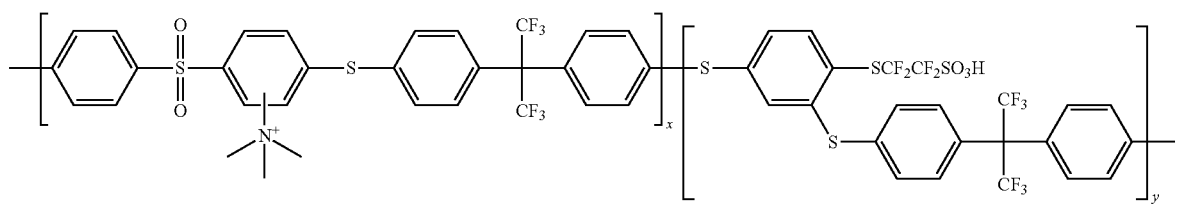

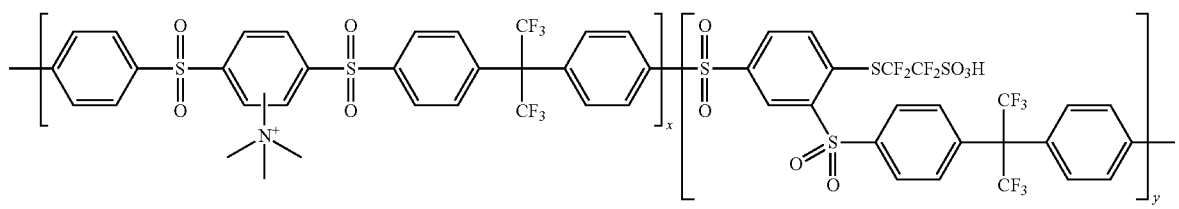

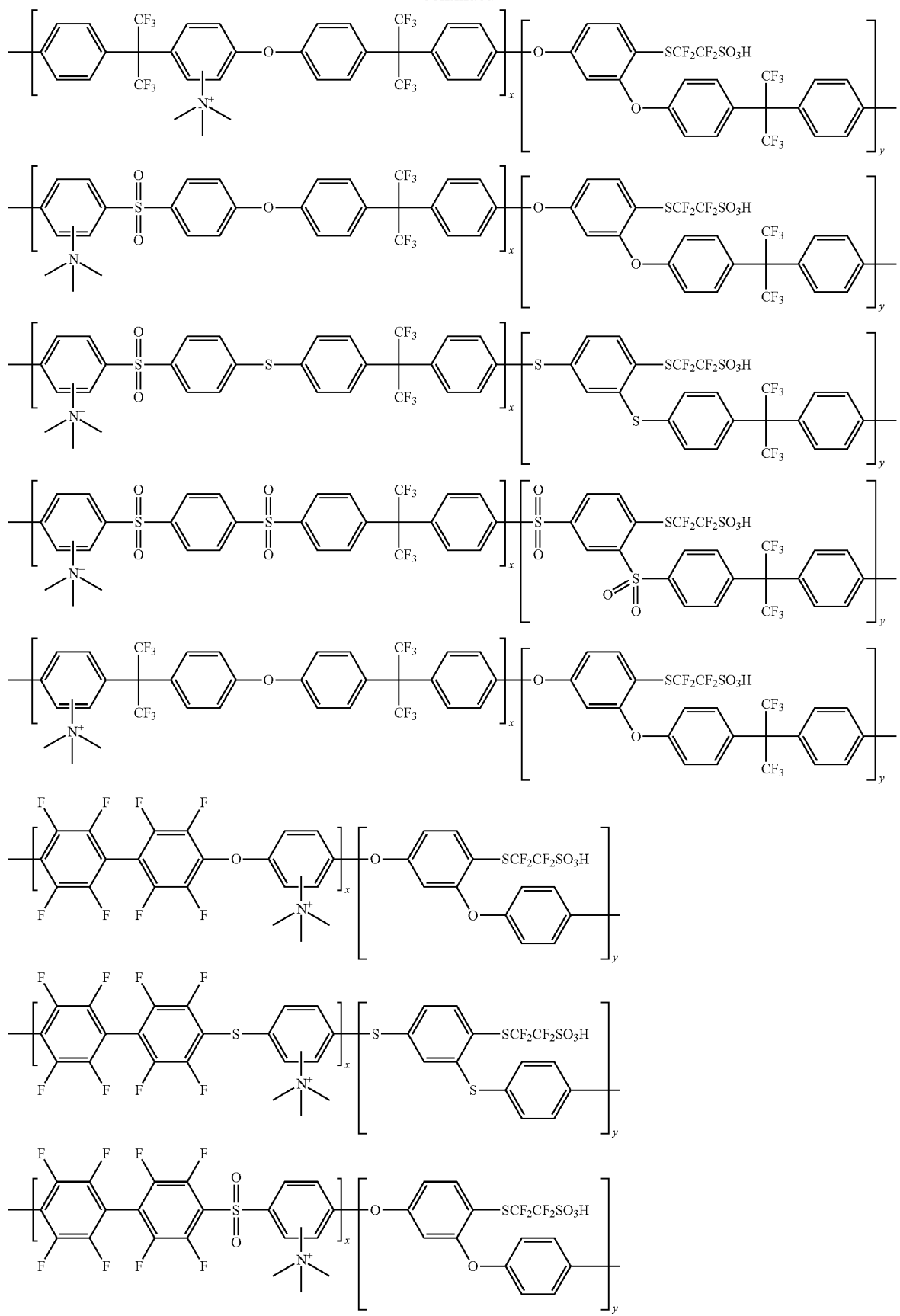

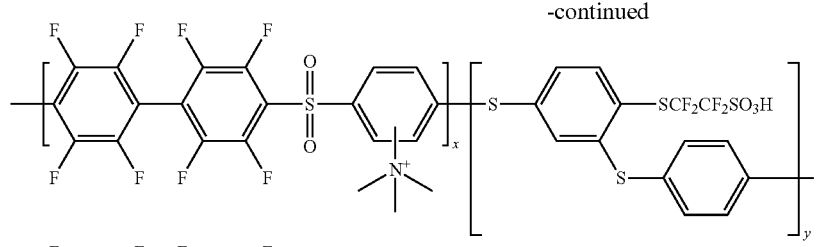

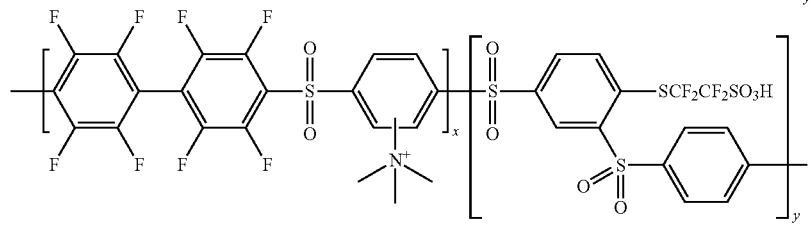

In one embodiment of the present specification, the hydrophilic block and the hydrophobic block are included in a mole ratio of 1:0.001 to 1:100 in the block polymer. In one embodiment of the present specification, the hydrophilic block and the hydrophobic block are included in a mole ratio of 1:1 to 1:0.001 in the block polymer. In another embodiment, the hydrophilic block and the hydrophobic block are included in a mole ratio of 1:0.1 to 1:0.01 in the block polymer.

In one embodiment of the present specification, the hydrophobic block is preferably included in 0.1 mol % to 50 mol % and more preferably in 1 mol % to 10 mol % based on the whole polymer of the block polymer.

In this case, an ion transfer ability of the block polymer may be enhanced.

In one embodiment of the present specification, the unit represented by Chemical Formula 1 is included in 0.01 mol % to 100 mol % in the hydrophilic block based on the hydrophilic block.

In one embodiment of the present specification, the hydrophilic block has a number average molecular weight of 1,000 g/mol to 300,000 g/mol. In a specific embodiment, the number average molecular weight is from 2,000 g/mol to 100,000 g/mol. In another embodiment, the number average molecular weight is from 2,500 g/mol to 50,000 g/mol.

In one embodiment of the present specification, the hydrophobic block has a number average molecular weight of 1,000 g/mol to 300,000 g/mol. In a specific embodiment, the number average molecular weight is from 2,000 g/mol to 100,000 g/mol. In another embodiment, the number average molecular weight is from 2,500 g/mol to 50,000 g/mol.

In one embodiment of the present specification, the block polymer may further include a brancher. The brancher in the present specification performs a role of linking or crosslinking polymer chains.

In the block polymer further including the brancher in the present specification, the brancher may directly form a main chain of the polymer, and a mechanical degree of integration of a thin membrane may be enhanced. Specifically, in the branched block polymer of the present disclosure, the brancher directly forms a main chain of the polymer without carrying out a post-sulfonation reaction or a cross-linking reaction of a sulfonated polymer by polymerizing branched hydrophobic blocks that do not include acid substituents and branched hydrophilic blocks that include acid substituents, and the hydrophobic blocks maintaining a mechanical degree of integration of a thin membrane and the hydrophilic blocks providing ion conductivity to the thin membrane are alternately linked through chemical bonds.

In one embodiment of the present specification, the block polymer further includes a brancher derived from a compound represented by the following Chemical Formula 6; or a brancher represented by the following Chemical Formula 7.

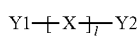   [Chemical Formula 6]

   [Chemical Formula 7]

In Chemical Formulae 6 and 7,

X is S; O; CO; SO; $SO_2$; NR''''; a hydrocarbon-based or fluorine-based assembly, l is an integer of 0 to 10, when l is 2 or greater, the two or more Xs are the same as or different from each other, $Y_1$ and $Y_2$ are the same as or different from each other, and each independently NR'R'', an aromatic ring in which one, two or more are substituted with substituents selected from the group consisting of a hydroxyl group and a halogen group; or an aliphatic ring in which one, two or more are substituted with substituents selected from the group consisting of a hydroxyl group and a halogen group, R' and R'' are the same as or different from each other, and each independently hydrogen; an aromatic ring substituted with a halogen group; or an aliphatic ring substituted with a halogen group, and Z is a trivalent organic group.

Examples of the substituents of the present specification are be described below, however, the substituents are not limited thereto.

In the present specification, the "derived" means producing new bonds as bonds of a compound are cut or substituents fall off, and the unit derived from the compound may mean a unit linked to the main chain of a polymer. The unit may form a polymer by being included in the main chain of the polymer.

In one embodiment of the present specification, the unit derived from the compound represented by Chemical Formula 1 may mean, when at least two of $R_1$ to $R_5$ are a halogen group, linking to the main chain of the polymer as the halogen groups fall off. In another embodiment, the unit derived from the compound represented by Chemical Formula 1 may mean, when at least two of $R_1$ to $R_5$ are a hydroxyl group, linking to the main chain of the polymer by releasing a halogen group of a comonomer that has the halogen group.

In one embodiment of the present specification, the unit derived from the compound represented by Chemical Formula 4 may mean $E_1$ and $E_2$ being a hydroxyl group; a thiol group; or a halogen group, and linking to the main chain of the polymer while the thiol group or the hydroxyl group being dehydrogenated. The derived unit may also include the meaning of linking to the main chain of the polymer while being dehydrogenated, and also include modifying a site linking to the main chain through post-treatment such as acid treatment and heat treatment.

For example, in one embodiment of the present specification, a linking group of —O— may be provided in the main chain of the polymer when E1 or E2 is a hydroxyl group, and a linking group of —S— may be provided in the main chain of the polymer when E1 and E2 are a thiol group. In addition, as necessary, the linking group of —S— in the main chain of the polymer may be modified to —$SO_2$— through acid treatment.

In addition, specifically, the brancher derived from the compound of Chemical Formula 6 in the present specification may function as a brancher as, in each of Y1 and Y2, an aromatic ring substituted with a halogen group; or an aliphatic ring substituted with a halogen group, the halogen group falls off from the aromatic ring or the aliphatic ring. Specifically, the brancher derived from the compound of Chemical Formula 4 in the present specification may function as a brancher in the polymer as two or more halogen groups fall off.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

In the present specification, the hydrocarbon-based means an organic compound formed only with carbon and hydrogen, and includes, but is not limited to, linear, branched, cyclic hydrocarbon and the like. In addition, a single bond, a double bond or a triple bond may be included, however, the hydrocarbon-based is not limited thereto.

In the present specification, the fluorine-based assembly means a part or all of carbon-hydrogen bonds in the hydrocarbon-based are substituted with fluorine.

In the present specification, the aromatic ring may be an aromatic hydrocarbon ring or an aromatic heteroring, and may be monocyclic or multicyclic.

Specifically, examples of the aromatic hydrocarbon ring may include a monocyclic aromatic group such as a phenyl group, a biphenyl group and a terphenyl group, and a multicyclic aromatic group such as a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylene group and a fluoranthene group, but are not limited thereto.

In the present specification, the aromatic heteroring means a structure including one or more heteroatoms such as O, S, N and Se instead of a carbon atom in the aromatic hydrocarbon ring. Specific examples thereof may include a thiophene group, a furan group, a pyrrole group, an imidazole group, a thiazole group, an oxazole group, an oxadiazole group, a triazole group, a pyridyl group, a bipyridyl group, a pyrimidyl group, a triazine group, a triazole group, an acridyl group, a pyridazine group, a pyrazinyl group, a quinolinyl group, a quinazoline group, a quinoxalinyl group, a phthalazinyl group, a pyridopyrimidinyl group, a pyridopyrazinyl group, a pyrazinopyrazinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a phenanthroline group, an isoxazolyl group, a thiadiazolyl group, a phenothiazinyl group, a dibenzofuranyl group and the like, but are not limited thereto.

In the present specification, the aliphatic ring may be an aliphatic hydrocarbon ring or an aliphatic heteroring, and may be monocyclic or multicyclic. Examples of the aliphatic ring may include a cyclopentyl group, a cyclohexyl group and the like, but are not limited thereto.

In the present specification, the organic group may include an alkyl group, an alkenyl group, a cycloalkyl group, a cycloalkenyl group, an aryl group, an aralkyl group and the like. This organic group may include bonds or substituents besides a hydrocarbon group such as heteroatoms in the organic group. In addition, the organic group may be any of linear, branched or cyclic.

In the present specification, the trivalent organic group means a trivalent group having 3 binding sites in an organic compound.

In addition, the organic group may form a cyclic structure, and may form bonds including heteroatoms as long as it does not harm effects of the present disclosure.

Specifically, bonds including heteroatoms such as an oxygen atom, a nitrogen atom and a silicon atom may be included. Specific examples thereof may include ether bonds, thioether bonds, carbonyl bonds, thiocarbonyl bonds, ester bonds, amide bonds, urethane bonds, imino bonds (—N=C(—R)—: R represents a hydrogen atom or an organic group), carbonate bonds, sulfonyl bonds, sulfinyl bonds, azo bonds and the like, but are not limited thereto.

Examples of the cyclic structure may include the aromatic ring, the aliphatic ring and the like described above, and the cyclic structure may be monocyclic or multicyclic.

In the present specification, the alkyl group may be linear or branched, and although not particularly limited thereto, the number of carbon atoms is preferably from 1 to 50. Specific examples thereof may include a methyl group, an ethyl group, a propyl group, an isopropyl group, a butyl group, a t-butyl group, a pentyl group, a hexyl group, a heptyl group and the like, but are not limited thereto.

In the present specification, the alkenyl group may be linear or branched, and although not particularly limited thereto, the number of carbon atoms is preferably from 2 to 40. Specific examples thereof may include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

In the present specification, the cycloalkyl group is not particularly limited, but preferably has 3 to 60 carbon atoms, and particularly, may include a cyclopentyl group, a cyclohexyl group and the like, but is not limited thereto.

In one embodiment of the present specification, l is 3 or greater.

In one embodiment of the present specification, X is —S.

In another embodiment, X is a haloalkylene group.

More specifically, X may be —$CF_3CF_3$—.

In another embodiment, X is —$CH_2$—.

In another embodiment of the present specification, X is NR'.

In one embodiment of the present specification, Y1 and Y2 are the same as or different from each other, and each independently NR'R".

In one embodiment of the present specification, Y1 and Y2 are the same as or different from each other, and each independently a halogen-substituted aromatic ring.

In one embodiment of the present specification, Y1 and Y2 are the same as or different from each other, and each independently a fluorine-substituted aromatic hydrocarbon ring.

In another embodiment, Y1 and Y2 are each a fluorine-substituted phenyl group. Specific examples thereof may include 2,4-phenyl, 2,6-phenyl, 2,3-phenyl, 3,4-phenyl and the like, but are not limited thereto.

In one embodiment of the present specification, the compound represented by Chemical Formula 6 may be represented by any one of the following structures.

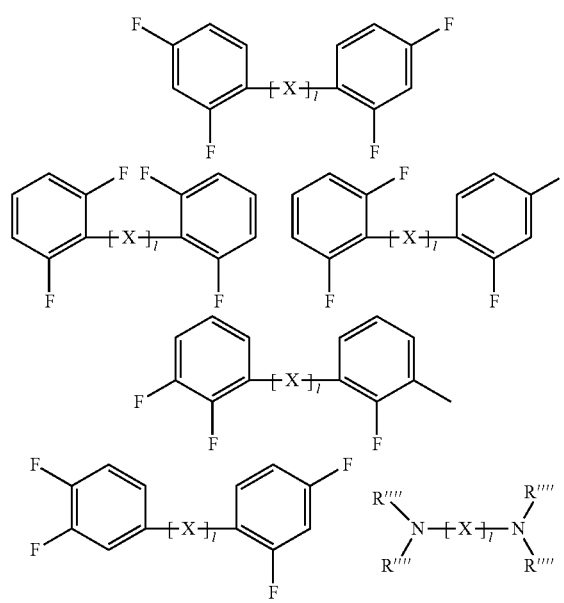

In the structures, X and l have the same definitions as in Chemical Formula 6,

R"" has the same definition as R in Chemical Formula 6.

According to one embodiment of the present specification, Z of Chemical Formula 7 may be represented by any one of the following Chemical Formulae 7-1 to 7-4.

[Chemical Formulae 7-1]

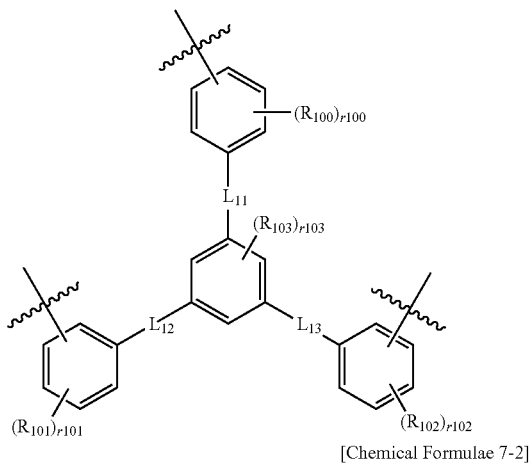

[Chemical Formulae 7-2]

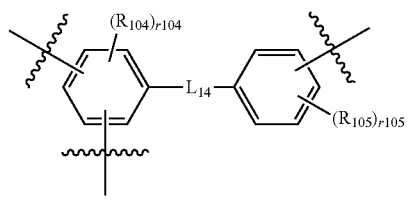

[Chemical Formulae 7-3]

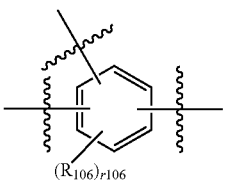

[Chemcial Formulae 7-4]

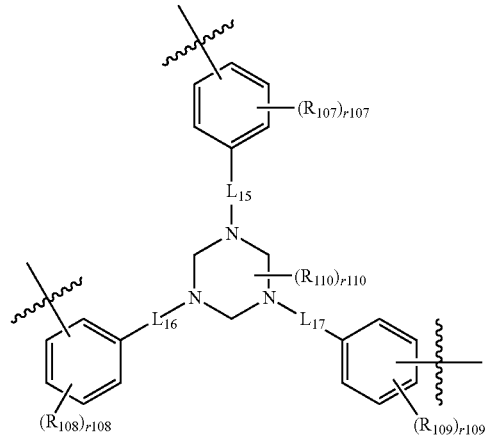

In Chemical Formulae 7-1 to 7-4, $L_{11}$ to $L_{17}$ are the same as or different from each other, and each independently a direct bond; —S—; —O—; —CO—; or —$SO_2$—, $R_{100}$ to $R_{110}$ are the same as or different from each other, and each independently hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted aryl group; or a substituted or unsubstituted heteroaryl group, r100, r101, r102, r105, r107, r108 and r109 are each an integer of 1 to 4, r103, r104, r106 and r110 are each an integer of 1 to 3, and when r100 to r110 are each an integer of 2 or greater, structures in the two or more parentheses are the same as or different from each other.

In one embodiment of the present specification, $L_{11}$ is —CO—.

In another embodiment, $L_{11}$ is —SO$_2$—.

In another embodiment, $L_{11}$ is —S—.

In another embodiment, $L_{12}$ is —CO—.

In another embodiment, $L_{12}$ is —SO$_2$—.

In another embodiment, $L_{12}$ is —S—.

In one embodiment of the present specification, $L_{13}$ is —CO—.

In another embodiment, $L_{13}$ is —SO$_2$—.

In another embodiment, $L_{13}$ is —S—.

In one embodiment of the present specification, $L_{14}$ is —CO—.

In another embodiment, $L_{14}$ is —SO$_2$—.

In one embodiment of the present specification, $L_{15}$ is a direct bond.

In another embodiment, $L_{16}$ is a direct bond.

In another embodiment, $L_{17}$ is a direct bond.

In one embodiment of the present specification, $R_{100}$ to $R_{110}$ are hydrogen.

In one embodiment of the present specification, $R_{106}$ is a halogen group.

In another embodiment, $R_{106}$ is fluorine.

In addition, in one embodiment of the present specification, the brancher represented by Chemical Formula 7 may be represented by any one of the following structures.

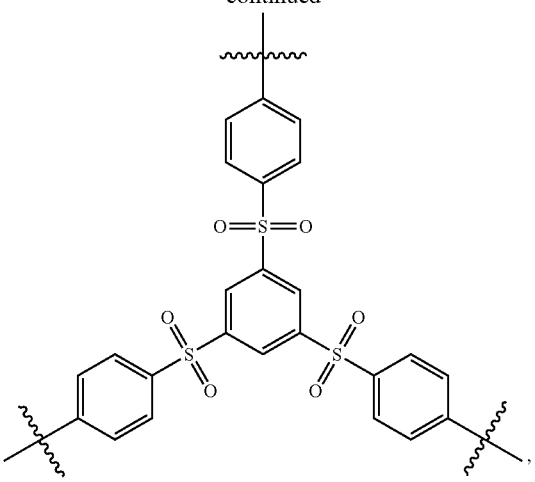

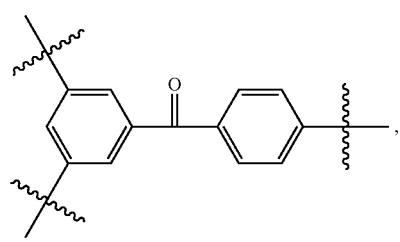

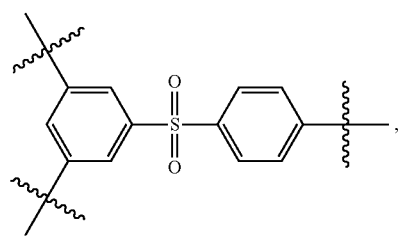

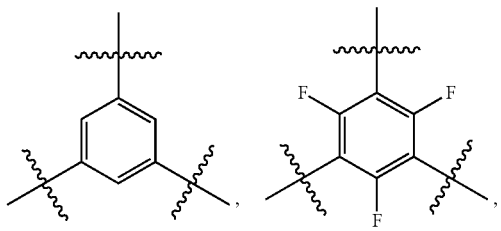

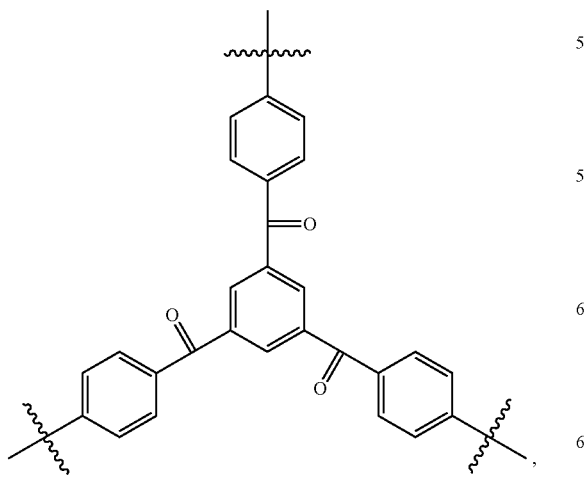

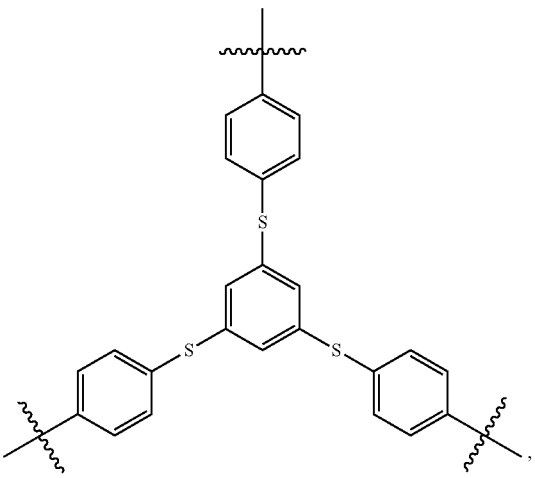

-continued

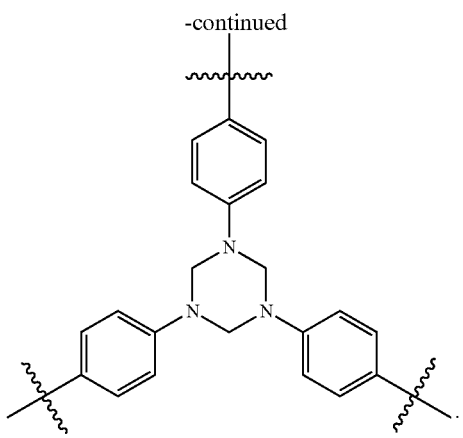

In one embodiment of the present specification, the polymer has a weight average molecular weight of 500 g/mol to 5,000,000 g/mol. In another embodiment of the present specification, the polymer has a weight average molecular weight of 10,000 g/mol to 3,000,000 g/mol. When the polymer has a weight average molecular weight in the above-mentioned range, mechanical properties of an electrolyte membrane including the polymer do not decline, and proper polymer solubility is maintained, and as a result, the electrolyte membrane may be readily prepared.

In addition, one embodiment of the present specification provides a polymer electrolyte membrane including the block polymer described above.

When including the block polymer including the unit represented by Chemical Formula 1 according to one embodiment of the present specification, high mechanical strength and high ion conductivity is obtained, and phase separation of the electrolyte membrane may be readily accomplished.

In the present specification, the "electrolyte membrane" is a membrane capable of exchanging ions, and includes a membrane, an ion-exchange membrane, an ion-transfer membrane, an ion-conductive membrane, a separator, an ion-exchange separator, an ion-transfer separator, an ion-conductive separator, an ion-exchange electrolyte membrane, an ion-transfer electrolyte membrane, an ion-conductive electrolyte membrane or the like.

The polymer electrolyte membrane according to one embodiment of the present specification may be prepared using materials and/or methods known in the art except for including a block polymer including a hydrophilic block including the unit represented by Chemical Formula 1; and a hydrophobic block including at least one cationic side chain.

According to one embodiment of the present specification, the polymer electrolyte membrane has ion conductivity of greater than or equal to 0.01 S/cm and less than or equal to 0.5 S/cm. In another embodiment, the polymer electrolyte membrane has ion conductivity of greater than or equal to 0.01 S/cm and less than or equal to 0.3 S/cm.

In one embodiment of the present specification, ion conductivity of the polymer electrolyte membrane may be measured under a humidity condition. A humidity condition in the present specification may mean relative humidity (RH) of 10% to 100%.

In addition, in one embodiment of the present specification, the polymer electrolyte membrane has an ion exchange capacity (IEC) value of 0.01 mmol/g to 5 mmol/g. When the polymer electrolyte membrane has an ion exchange capacity value in the above-mentioned range, ion channels are formed in the polymer electrolyte membrane, and the polymer may exhibit ion conductivity.

In one embodiment of the present specification, the polymer electrolyte membrane has a thickness of 1 μm to 500 μm. The polymer electrolyte membrane having the above-mentioned thickness range reduces electric short and electrolyte material crossover, and may exhibit an excellent cation conductivity property.

One embodiment of the present specification also provides a membrane-electrode assembly including an anode; a cathode; and the polymer electrolyte membrane described above provided between the anode and the cathode.

The membrane-electrode assembly (MEA) means an assembly of electrodes (cathode and anode) in which an electrochemical catalyst reaction of fuel and air occurs and a polymer membrane in which hydrogen ion transfer occurs, and is a single assembled unit in which electrodes (cathode and anode) and an electrolyte membrane are adhered.

The membrane-electrode assembly of the present specification has a form of a catalyst layer of an anode and a catalyst layer of a cathode being brought into contact with an electrolyte membrane, and may be prepared using common methods known in the art. As one example, the membrane-electrode assembly may be prepared through thermocompressing the cathode; the anode; and the electrolyte membrane located between the cathode and the anode at 100° C. to 400° C. while sticking these together.

The anode electrode may include an anode catalyst layer and an anode gas diffusion layer. The anode gas diffusion layer may again include an anode micropore layer and an anode electrode base.

The cathode electrode may include a cathode catalyst layer and a cathode gas diffusion layer. The cathode gas diffusion layer may again include a cathode micropore layer and a cathode electrode base.

FIG. 1 is a diagram schematically showing a principle of electricity generation of a fuel cell, and in the fuel cell, a most basic unit generating electricity is a membrane-electrode assembly (MEA), and this is formed with an electrolyte membrane (100), and anode (200*a*) and cathode (200*b*) electrodes formed on both sides of this electrolyte membrane (100). When referring to FIG. 1 showing a principle of electricity generation of a fuel cell, an oxidation reaction of fuel such as hydrogen, methanol, or hydrocarbon such as butane occurs in the anode (200*a*) to generate hydrogen ions (H⁺) and electrons (e⁻), and the hydrogen ions migrate to the cathode (200*b*) through the electrolyte membrane (100). In the cathode (200*b*), water is produced through the reaction of the hydrogen ions transferred through the electrolyte membrane (100), an oxidizer such as oxygen, and electrons. Electrons migrate to an external circuit through such a reaction.

The anode electrode catalyst layer is a place where an oxidation reaction of fuel occurs, and catalysts selected from the group consisting of platinum, ruthenium, osmium, platinum-ruthenium alloys, platinum-osmium alloys, platinum-palladium alloys and platinum-transition metal alloys may be preferably used. The cathode electrode catalyst layer is a place where a reduction reaction of an oxidizer occurs, and platinum or platinum-transition metal alloys may be preferably used as catalysts. The catalysts may be used as they are, or may be used while being supported on a carbon-based carrier.

The process of introducing the catalyst layer may be carried out using common methods known in the art, and for example, a catalyst ink may be directly coated on the electrolyte membrane, or coated on the gas diffusion layer to form the catalyst layer. Herein, the coating method of the catalyst ink is not particularly limited, and methods of spray coating, tape casting, screen printing, blade coating, die coating, spin coating or the like may be used. The catalyst ink may be typically formed with a catalyst, a polymer ionomer and a solvent.

The gas diffusion layer becomes a migration path of reaction gases and water while performing a role of a current conductor, and has a porous structure. Accordingly, the gas diffusion layer may be formed including a conductive base. As the conductive base, carbon paper, carbon cloth or carbon felt may be preferably used. The gas diffusion layer may be formed further including a micropore layer between the catalyst layer and the conductive base. The micropore layer may be used for enhancing fuel cell performance under a low humidity condition, and performs a role of allowing the electrolyte membrane to be under a sufficiently wet condition by having the amount of water escaping outside the gas diffusion layer being small.

One embodiment of the present specification provides a polymer electrolyte membrane-type fuel cell including two or more membrane-electrode assemblies; a stack including a bipolar plate provided between the membrane-electrode assemblies; a fuel supply unit supplying fuel to the stack; and an oxidizer supply unit supplying an oxidizer to the stack.

A fuel cell is an energy conversion device directly converting chemical energy of fuel into electric energy. In other words, a fuel cell employs a power generation method utilizing a fuel gas and an oxidizer, and using electrons generated during the oxidation and reduction reactions thereof to produce power.

The fuel cell may be prepared through common methods known in the art using the membrane-electrode assembly (MEA) described above. For example, the fuel cell may be prepared by forming with the membrane-electrode assembly (MEA) prepared above and a bipolar plate.

The fuel cell of the present specification is formed including a stack, a fuel supply unit and an oxidizer supply unit.

FIG. 3 is a diagram schematically illustrating the fuel cell, and the fuel cell is formed including a stack (60), an oxidizer supply unit (70) and a fuel supply unit (80).

The stack (60) includes one, two or more of the membrane-electrode assemblies described above, and when two or more of the membrane-electrode assemblies are included, a separator provided therebetween is included. The separator prevents the membrane-electrode assemblies from being electrically connected, and performs a role of transferring fuel and oxidizer supplied from the outside to the membrane-electrode assemblies.

The oxidizer supply unit (70) performs a role of supplying an oxidizer to the stack (60). As the oxidizer, oxygen is typically used, and oxygen or air may be injected with a pump (70) to be used.

The fuel supply unit (80) performs a role supplying fuel to the stack (60), and may be formed with a fuel tank (81) storing fuel, and a pump (82) supplying the fuel stored in the fuel tank (81) to the stack (60). As the fuel, hydrogen or hydrocarbon fuel in a gas or liquid state may be used. Examples of the hydrocarbon fuel may include methanol, ethanol, propanol, butanol or natural gas.

The fuel cell may include a polymer electrolyte membrane fuel cell, a direct liquid fuel cell, a direct methanol fuel cell, a direct formic acid fuel cell, a direct ethanol fuel cell, a direct dimethyl ether fuel cell or the like.

When using the electrolyte membrane according to one embodiment of the present specification as an ion-exchange membrane of the fuel cell, effects described above may be obtained.

In addition, one embodiment of the present specification provides a redox flow battery including a positive electrode cell including a positive electrode and a positive electrode liquid electrolyte; a negative electrode cell including a negative electrode and a negative electrode liquid electrolyte; and the polymer electrolyte membrane according to one embodiment of the present specification provided between the positive electrode cell and the negative electrode cell.

A redox flow battery (oxidation-reduction flow battery) is a system charged-discharged by active materials included in a liquid electrolyte being oxidized-reduced, and is an electrochemical storage device directly storing chemical energy of the active materials as electric energy. A redox flow battery uses a principle of being charged and discharged from the exchange of electrons occurring when liquid electrolytes including active materials in different oxidation states meet with an ion-exchange membrane in between. A redox flow battery is generally formed with a tank holding a liquid electrolyte, a battery cell where charge and discharge occur, and a circulating pump for circulating the liquid electrolyte between the tank and the battery cell, and a unit cell of the battery cell includes an electrode, an electrolyte and an ion-exchange membrane.

When using the electrolyte membrane according to one embodiment of the present specification as an ion-exchange membrane of the redox flow battery, effects described above may be obtained.

The redox flow battery of the present specification may be prepared using common methods known in the art except that the redox flow battery includes the polymer electrolyte membrane according to one embodiment of the present specification.

As illustrated in FIG. 2, the redox flow battery is divided into a positive electrode cell (32) and a negative electrode cell (33) by an electrolyte membrane (31). The positive electrode cell (32) and the negative electrode cell (33) include a positive electrode and a negative electrode, respectively. The positive electrode cell (32) is connected to a positive electrode tank (10) for supplying and releasing a positive electrode liquid electrolyte (41) through a pipe. The negative electrode cell (33) is also connected to a negative electrode tank (20) for supplying and releasing a negative electrode liquid electrolyte (42) through a pipe. The liquid electrolytes circulate through pumps (11, 21), and through an oxidation/reduction reaction (that is, a redox reaction) changing the oxidation number of ions, charge and discharge occur in the positive electrode and the negative electrode.

Hereinafter, the present specification will be described in detail with reference to examples in order to specifically describe the present specification. However, the examples according to the present specification may be modified to various different forms, and the scope of the present specification is not to be construed as being limited to the examples described below. The examples of the present specification are provided in order to more fully describe the present specification to those having average knowledge in the art.

Preparation Example 1

Synthesis of 2-(bromomethyl)-1-fluoro-4-((4-fluorophenyl)sulfonyl)benzene

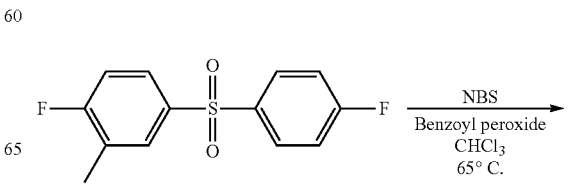

-continued

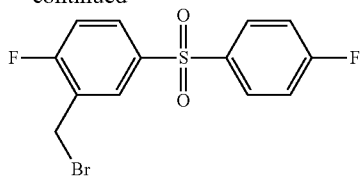

200 g (0.75 mol) of 1-fluoro-4-((4-fluorophenyl)sulfonyl)-2-methylbenzene was dissolved in 1500 ml of chloroform, and 18.1 g (74.5 mmol) of benzoyl peroxide was added thereto. 398 g (2.24 mol) of N-bromosuccinimide was slowly added dropwise thereto, and then the reactant was heated to 65° C., and stirred for 5 hours at the same temperature. After the reaction was completed, the reactant was cooled to room temperature, diluted with ethyl acetate, and then washed several times using a saturated aqueous $NaHCO_3$ solution. The organic layer obtained as above was dried using magnesium sulfate ($MgSO_4$) and distilled to obtain 2-(bromomethyl)-1-fluoro-4-((4-fluorophenyl)sulfonyl)benzene in a crude state. The crude compound obtained as above was used in the next reaction without an additional separation and purification process.

Preparation Example 2

Synthesis of 1-(2-fluoro-5-((4-fluorophenyl)sulfonyl)phenyl)-N,N-dimethylmethaneamine hydrochloride

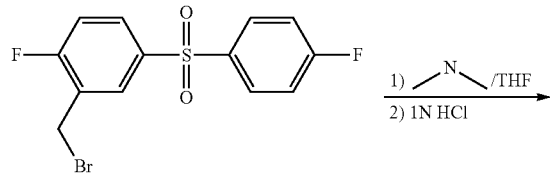

-continued

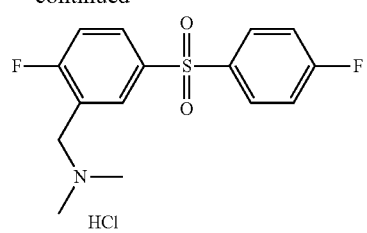

After dissolving the crude 2-(bromomethyl)-1-fluoro-4-((4-fluorophenyl)sulfonyl)benzene obtained in Preparation Example 1 in 1500 ml of tetrahydrofuran (THF), the reactant was cooled to 0° C., and 420 g (3.73 mol) of dimethylamine (40 wt % in $H_2O$) was slowly added dropwise thereto. After raising a temperature of the reactant to room temperature, the reactant was stirred for 4 hours at room temperature. The solvent was removed by vacuum distillation, the result was diluted with ethyl acetate, and then 1 N HCl was added dropwise thereto. The water layer obtained as above was washed several times with ethyl acetate to remove impurities, and through vacuum distilling the acidic water layer, a solid compound in a HCl salt form was obtained. The solid compound obtained as above was introduced to methylene chloride, the result was stirred at room temperature in a slurry state, and then filtered and dried under $N_2$ gas to obtain a highly purified final compound 1-(2-fluoro-5-((4-fluorophenyl)sulfonyl)phenyl)-N,N-dimethylmethaneamine hydrochloride in a 42% yield (2 step yield).

The NMR spectrum of the 1-(2-fluoro-5-((4-fluorophenyl)sulfonyl)phenyl)-N,N-dimethylmethaneamine hydrochloride is shown in FIG. 4.

Example 1

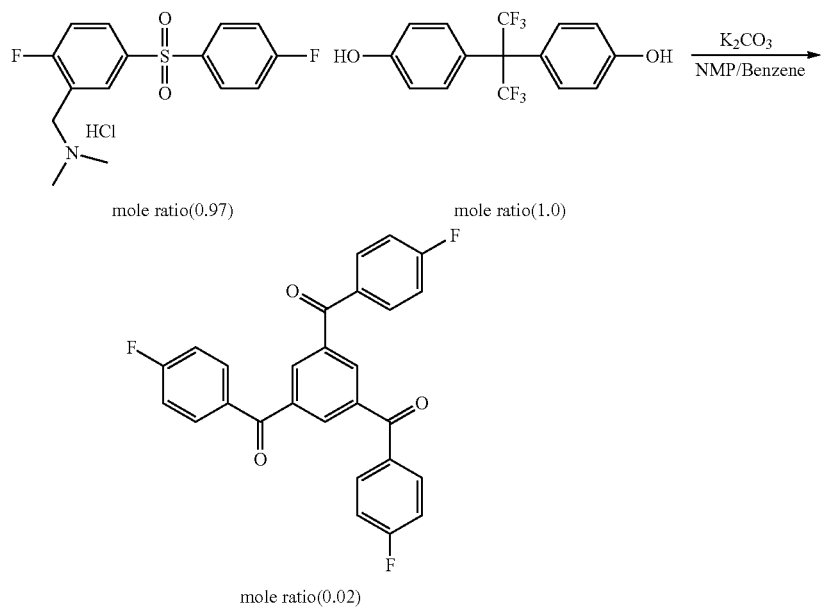

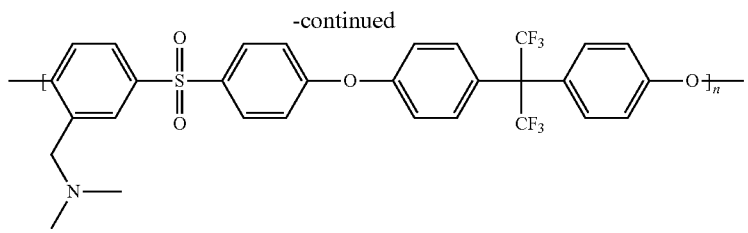

Each monomer of Reaction Formula 1 and potassium carbonate ($K_2CO_3$: mole ratio 4) were mixed in 30 wt % ratio of methyl pyrrolidone (NMP) and 20 wt % ratio of benzene, and the result was polymerized for 4 hours at 140° C. and 16 hours at 180° C. to prepare a polymer of Reaction Formula 1. H-NMR of the polymer of Reaction Formula 1 is as shown in FIG. 5, and after dissolving the polymer in dimethylacetamide (DMAC), the H-NMR experiment was progressed in a $CDCl_3$ solvent.

[Reaction Formula 2]

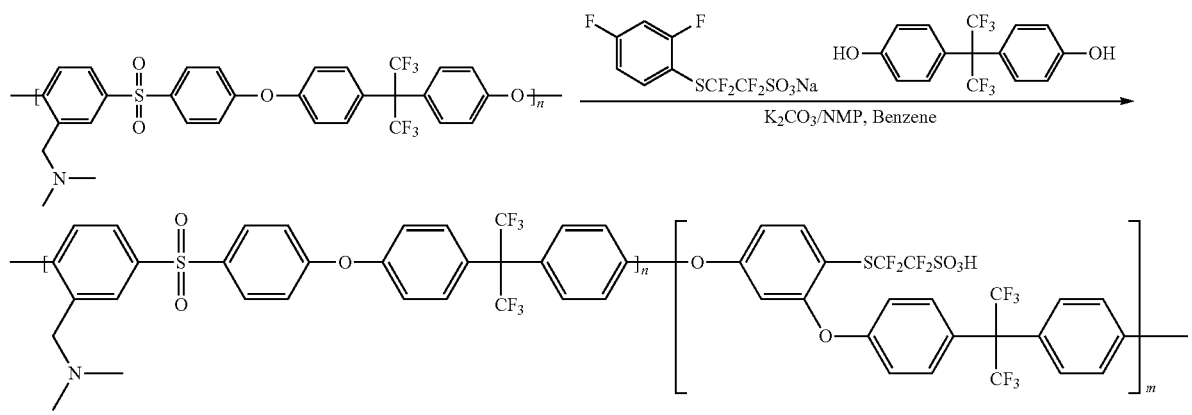

To the polymer synthesized in Reaction Formula 1, each monomer of Reaction Formula 2 and potassium carbonate ($K_2CO_3$: mole ratio 4) were mixed in 30 wt % ratio of methyl pyrrolidone (NMP) and 20 wt % ratio of benzene, and the result was polymerized for 4 hours at 140° C. and 16 hours at 180° C. to prepare a polymer of Reaction Formula 2.

Example 2

After dissolving the polymer of Reaction Formula 2 obtained in Example 1 in dimethylacetamide (DMAC) in a concentration of 5 wt %, 5 eq. of methyl iodide was added thereto, and the result was reacted for 6 hours at room temperature to finally prepare a polymer of the following Reaction Formula 3. The NMR spectrum of the final polymer of Reaction Formula 3 is shown in FIG. 6.

[Reaction Formula 3]

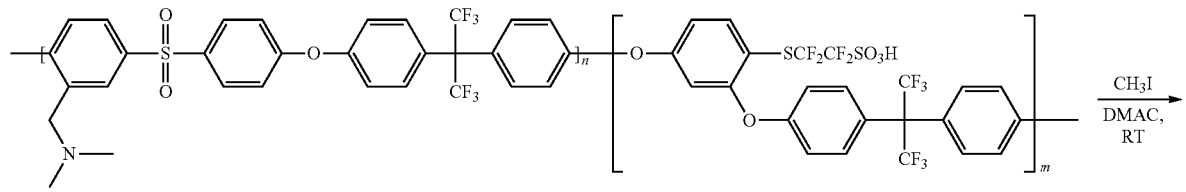

-continued

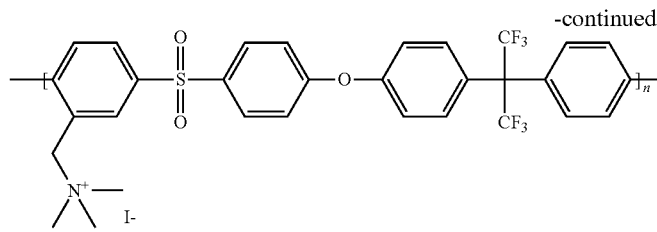
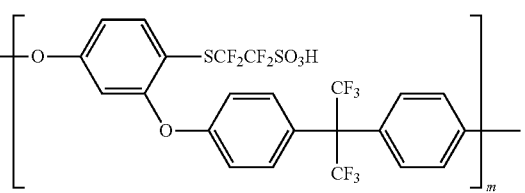

Comparative Example

Vanadium permeability of an electrolyte membrane using each of the copolymer of Example 2 and Nafion 115 was measured and shown in the following Table 1.

TABLE 1

| | $VO^{2+}$ Permeability (cm²/min) × $10^{-6}$ |
|---|---|
| Example 2 | 0.48 |
| Nafion 115 (Comparative Example) | 5.84 |

The vanadium ion permeability was obtained by filling one side with a 1 M $VOSO_4$ in 2 M $H_2SO_4$ solution, filling the other side with a 1 M $MgSO_4$ in 2 M $H_2SO_4$ solution, then installing an electrolyte membrane between the two solutions, and measuring a time-dependent $VO^{2+}$ concentration in the 1 M $MgSO_4$ in 2 M $H_2SO_4$ solution.

The measurement was made in an active area of 7.69 cm², a volume of 200 ml and at room temperature.

It was seen that, the electrolyte membrane including the copolymer according to Example 2 had a greatly decreased vanadium ion permeability compared to the existing Nafion electrolyte membrane due to the presence of a cationic functional group on the main chain of the electrolyte membrane compared to the Nafion 115 electrolyte membrane. Based on such a result, a vanadium ion ($VO^{2+}$) crossover effect caused by a Donnan effect may be effectively suppressed, and the electrolyte membrane including the copolymer according to one embodiment of the present disclosure may be predicted to have superior performance.

In addition, a fluorine element is included in the main chain of the electrolyte membrane, which may be predicted to greatly contribute to enhancing electrolyte membrane durability.

Accordingly, when manufacturing a fuel cell or a redox flow battery using the electrolyte membrane according to the present specification, battery efficiency may be enhanced.

The invention claimed is:

1. A block polymer comprising:
   a hydrophobic block; and
   a hydrophilic block,
   wherein the hydrophilic block includes a unit derived from a compound represented by the following Chemical Formula 1, and
   the hydrophobic block includes a cationic group and a halogen group:

[Chemical Formula 1]

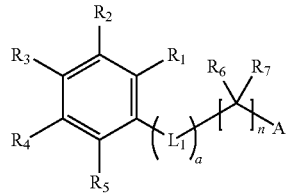

in Chemical Formula 1,

A is $-SO_3H$, $-SO_3^-M^+$, $-COOH$, $-COO^-M^+$, $-PO_3H_2$, $-PO_3H^-M^+$, $-PO_3^{2-}2M^+$, $-O(CF_2)_mSO_3H$, $-O(CF_2)_mSO_3^-M^+$, $-O(CF_2)_mCOOH$, $-O(CF_2)_mCOO^-M^+$, $-O(CF_2)_mPO_3H_2$, $-O(CF_2)_mPO_3H^-M^+$ or $-O(CF_2)_mPO_3^{2-}2M^+$;

m is an integer of 2 to 6;

M is a group 1 element;

$R_1$ to $R_5$ are the same as or different from each other, and each independently hydrogen;

a halogen group; or a hydroxyl group;

at least two of $R_1$ to $R_5$ are a halogen group; or a hydroxyl group;

$R_6$ and $R_7$ are the same as or different from each other, and each independently a halogen group;

$L_1$ is a direct bond; $-S-$; $-O-$; $-N(R)-$; $-SO_2-$; or a substituted or unsubstituted alkylene group having 1 to 10 carbon atoms;

a is an integer of 0 to 2, and when a is 2, structures in the parentheses are the same as or different from each other;

R is hydrogen; or a substituted or unsubstituted alkyl group;

n is an integer of 2 to 10, and when n is 2 or greater, structures in the parentheses are the same as or different from each other, wherein the hydrophobic block includes a unit derived from one or more types of a compound represented by the following Chemical Formula 3, a compound represented by the following Chemical Formula 4, and a compound represented by the following Chemical Formula 5:

[Chemical Formula 3]

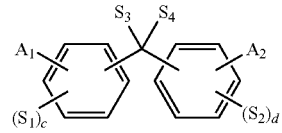

37
-continued

[Chemical Formula 4]

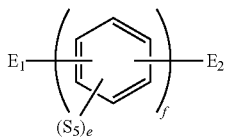

[Chemical Formula 5]

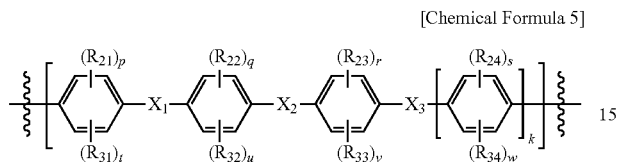

in Chemical Formula 3 and Chemical Formula 4:
$A_1$ and $A_2$ are the same as or different from each other, and each independently a hydroxyl group; a thiol group; or a halogen group;
$S_1$ and $S_2$ are the same as or different from each other, and each independently hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group; $-(L_2)_b-N^+R_{11}R_{12}R_{13}$; $-(L_2)_b-P^+R_{11}R_{12}R_{13}$; or a structure represented by the following Chemical Formula 2;
c and d are each an integer of 1 to 4;
when c and d are each an integer of 2 or greater, structures in the two or more parentheses are the same as or different from each other;
$S_3$ and $S_4$ are the same as or different from each other, and each independently hydrogen; a halogen group; an alkyl group; or a haloalkyl group;
$E_1$ and $E_2$ are the same as or different from each other, and each independently a hydroxyl group; a thiol group; or a halogen group;
e is an integer of 1 to 4;
f is an integer of 1 to 3;
when e and f are each an integer of 2 or greater, structures in the parentheses are the same as or different from each other;
$S_5$ is hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted aryl group; a substituted or unsubstituted heterocyclic group $-(L_2)_b-N^+R_{11}R_{12}R_{13}$; $-(L_2)_b-P^+R_{11}R_{12}R_{13}$; or a structure represented by the following Chemical Formula 2;
$S_3$ and $S_4$ are each independently a halogen group or a haloalkyl group, or $S_5$ is a halogen group or a haloalkyl group; and
the hydrophobic block includes one, two or more of $-(L_2)_b-N^+R_{11}R_{12}R_{13}$; $-(L_2)_b-P^+R_{11}R_{12}R_{13}$; and a structure represented by the following Chemical Formula 2,
in Chemical Formula 5:
$X_1$ is a direct bond; —CO—; —SO$_2$—; or an alkylene group substituted with a halogen group;

38
$X_2$ is —O—; or —S—;
$X_3$ is a direct bond or an alkylene group substituted with a halogen group;
k is 0 or 1;
p, q, r and s are each independently an integer of 0 to 4;
t, u, v and w are each independently 0 or 1;
a sum of t, u, v and w is 1 or greater;
a sum of p and t, a sum of q and u, a sum of r and v and a sum of s and w are each 4;
when p, q, r and s are each 2 or greater, substituents in the parentheses are the same as or different from each other;
$R_{21}$ to $R_{24}$ are the same as or different from each other, and each independently hydrogen or a halogen group;
at least one of $X_1$ and $X_3$ is an alkylene group substituted with a halogen group, and at least one of $R_{21}$ to $R_{24}$ is a halogen group;
$R_{31}$ to $R_{34}$ are hydrogen; $-(L_2)_b-N^+R_{11}R_{12}R_{13}$; $-(L_2)_b-P^+R_{11}R_{12}R_{13}$; or a cationic group represented by the Chemical Formula 2; and
at least one of $R_{31}$ to $R_{34}$ is $-(L_2)_b-N^+R_{11}R_{12}R_{13}$; $-(L_2)_b-P^+R_{11}R_{12}R_{13}$; or a cationic group represented by the Chemical Formula 2;

[Chemical Formula 2]

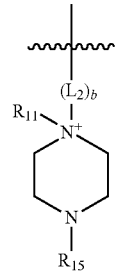

in Chemical Formula 2,
$L_2$ is a direct bond: —O—; —N($R_{14}$)—; —S—; —SO$_2$—; or a substituted or unsubstituted alkylene group having 1 to 10 carbon atoms;
b is an integer of 1 to 10;
when b is 2 or greater, the two or more $L_2$s are the same as or different from each other; and
$R_{11}$ to $R_{15}$ are the same as or different from each other, and each independently hydrogen; or a substituted or unsubstituted alkyl group having 1 to 10 carbon atoms.
2. The block polymer of claim 1, wherein Chemical Formula 3 is represented by the following Chemical Formula 3-1; and
Chemical Formula 4 is represented by the following Chemical Formula 4-1:

[Chemical Formula 3-1]

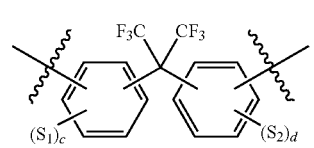

[Chemical Formula 4-1]

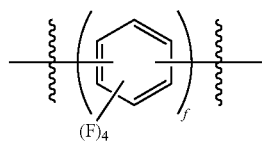

in Chemical Formula 3-1 and Chemical Formula 4-1, $S_1$, $S_2$, c, d and f have the same definitions as in Chemical Formula 3 or Chemical Formula 4.

3. The block polymer of claim 1, wherein the unit derived from the compound represented by Chemical Formula 1 is represented by any one of the following Chemical Formulae 1-1 to 1-9:

[Chemical Formulae 1-1]

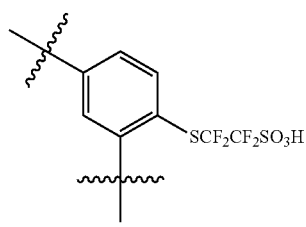

[Chemical Formulae 1-2]

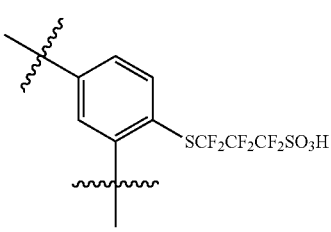

[Chemical Formulae 1-3]

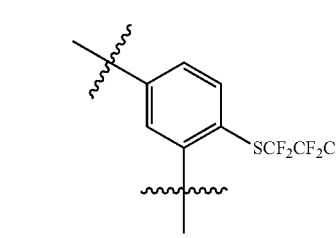

[Chemical Formulae 1-4]

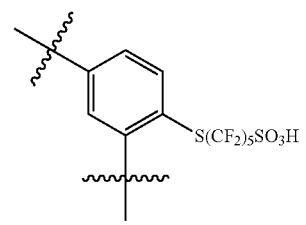

[Chemical Formulae 1-5]

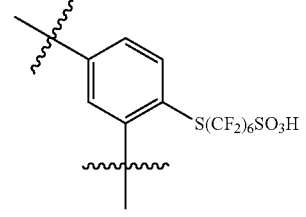

[Chemical Formulae 1-6]

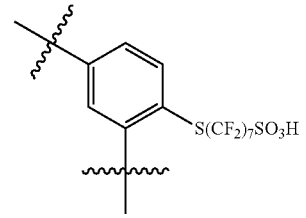

[Chemical Formulae 1-7]

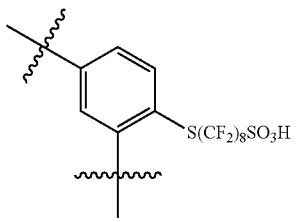

[Chemical Formulae 1-8]

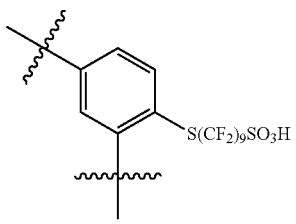

[Chemical Formulae 1-9]

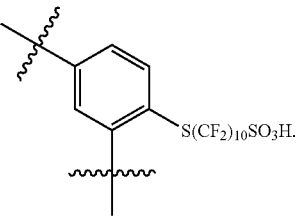

4. The block polymer of claim 1, wherein the hydrophilic block and the hydrophobic block are included in a mole ratio of 1:0.001 to 1:100 in the block polymer.

5. The block polymer of claim 1, further comprising a brancher.

6. The block polymer of claim 1, which has a weight average molecular weight of 500 g/mol to 5,000,000 g/mol.

7. A polymer electrolyte membrane comprising the block polymer of claim 1.

8. The polymer electrolyte membrane of claim 7, which has ion conductivity of 0.01 S/cm to 0.5 S/cm.

9. The polymer electrolyte membrane of claim 7, which has an ion exchange capacity (IEC) value of 0.01 mmol/g to 5 mmol/g.

10. The polymer electrolyte membrane of claim 7, which has a thickness of 1 μm to 500 μm.

11. A membrane-electrode assembly comprising:
an anode;
a cathode; and
the polymer electrolyte membrane of claim 7 provided between the anode and the cathode.

12. A polymer electrolyte type fuel cell comprising:
two or more of the membrane-electrode assemblies of claim 11;
a stack including a bipolar plate provided between the membrane-electrode assemblies;
a fuel supply unit supplying fuel to the stack; and
an oxidizer supply unit supplying an oxidizer to the stack.

13. A redox flow battery comprising:
a positive electrode cell including a positive electrode and a positive electrode liquid electrolyte;
a negative electrode cell including a negative electrode and a negative electrode liquid electrolyte; and
the polymer electrolyte membrane of claim 7 provided between the positive electrode cell and the negative electrode cell.

* * * * *